(12) United States Patent  (10) Patent No.: US 9,406,136 B2
Ishizawa et al.  (45) Date of Patent: Aug. 2, 2016

(54) INFORMATION PROCESSING DEVICE, INFORMATION PROCESSING METHOD AND STORAGE MEDIUM FOR IDENTIFYING COMMUNICATION COUNTERPART BASED ON IMAGE INCLUDING PERSON

(71) Applicant: CANON KABUSHIKI KAISHA, Tokyo (JP)

(72) Inventors: Masayuki Ishizawa, Yokohama (JP); Yasuo Okutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 14/322,309

(22) Filed: Jul. 2, 2014

(65) Prior Publication Data

US 2015/0010214 A1  Jan. 8, 2015

(30) Foreign Application Priority Data

Jul. 5, 2013 (JP) .................................. 2013-141729
Jul. 5, 2013 (JP) .................................. 2013-141734

(51) Int. Cl.
 G06K 9/00 (2006.01)
 G06T 7/00 (2006.01)
 G06K 9/46 (2006.01)

(52) U.S. Cl.
 CPC .......... *G06T 7/0042* (2013.01); *G06K 9/00221* (2013.01); *G06K 2009/4666* (2013.01); *G06T 2207/30201* (2013.01)

(58) Field of Classification Search
 USPC ................................................ 382/106, 118
 See application file for complete search history.

(56) References Cited

U.S. PATENT DOCUMENTS

| 2008/0304715 | A1* | 12/2008 | Ishida | ................ | G06K 9/00288 |
| | | | | | 382/118 |
| 2009/0208068 | A1* | 8/2009 | Tsunoda | ............ | H04N 1/00962 |
| | | | | | 382/118 |
| 2009/0248692 | A1* | 10/2009 | Tsukagoshi | ........... | H04L 65/403 |
| 2009/0304238 | A1* | 12/2009 | Ebata | ................ | G06K 9/00288 |
| | | | | | 382/118 |
| 2011/0043643 | A1* | 2/2011 | Yu | ...................... | H04N 1/00209 |
| | | | | | 348/207.1 |
| 2012/0281101 | A1* | 11/2012 | Fujinawa | ........... | H04N 1/00127 |
| | | | | | 348/207.1 |

FOREIGN PATENT DOCUMENTS

JP  2011-172089 A  9/2011

* cited by examiner

*Primary Examiner* — Yon Couso
(74) *Attorney, Agent, or Firm* — Canon U.S.A., Inc., IP Division

(57) ABSTRACT

An information processing device includes an imaging unit, a storage unit that stores face images of at least two persons, including an owner of the information processing device, in association with a communication device owned by each of the at least two persons, an identification unit that identifies, based on a first group of face images and a second group of face images, a person associated with a face image detected from an image including face images of a plurality of persons imaged by the imaging unit, the first group of face images includes the face image of each person detected from the image imaged by the imaging unit, and the second group of face images includes the faces stored in the storage unit, and a decision unit that decides a person as a receiver from the identified persons excluding the owner.

20 Claims, 24 Drawing Sheets

| REGISTERED FACE IMAGE | USER ID | DEVICE ID | FLAG |
|---|---|---|---|
|  | USER A | DEVICE A | ON |
|  | USER B | DEVICE B | OFF |
|  | USER C | DEVICE C | OFF |

| REGISTERED FACE IMAGE | USER ID | DEVICE ID | ATTRIBUTE |
|---|---|---|---|
| ☺ | USER A | DEVICE A | TRANSMITTER |
| ☺ | USER B | DEVICE B | RECEIVER |
| ☺ | USER C | DEVICE C | - |

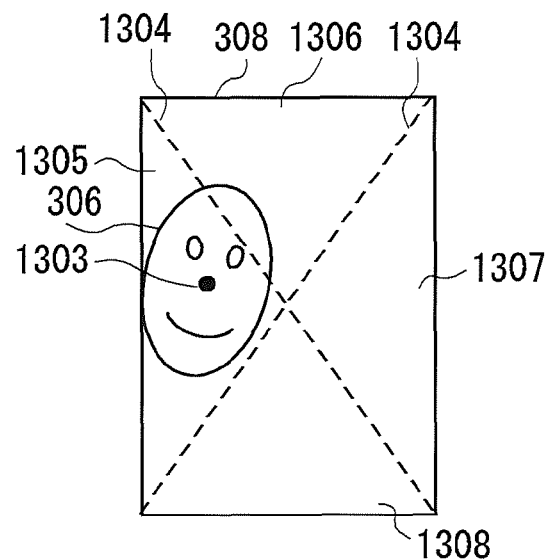
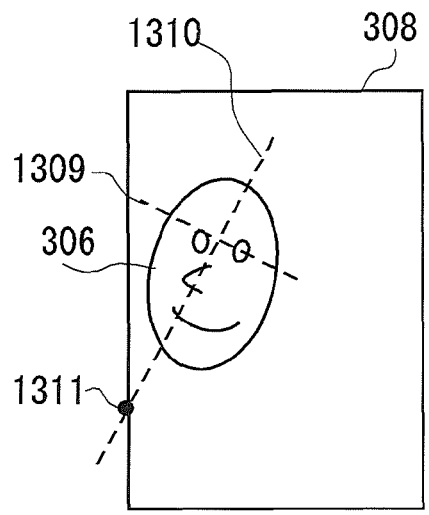
FIG. 13A    FIG. 13B
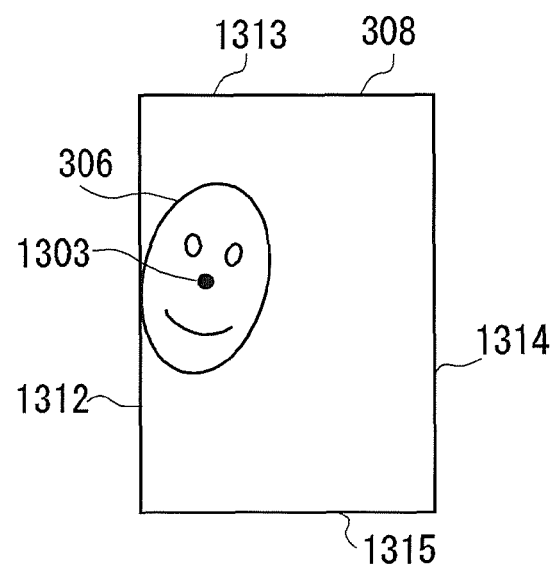
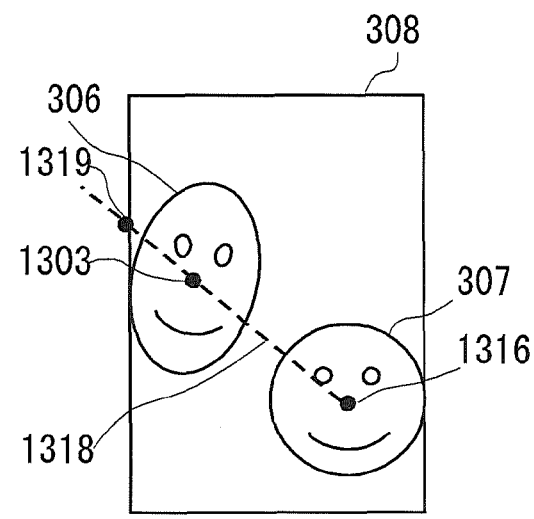
FIG. 13C    FIG. 13D

INFORMATION PROCESSING DEVICE, INFORMATION PROCESSING METHOD AND STORAGE MEDIUM FOR IDENTIFYING COMMUNICATION COUNTERPART BASED ON IMAGE INCLUDING PERSON

BACKGROUND

1. Field

Aspects of the present invention generally relate to a technology for identifying, by an information processing device, a communication device to be a counterpart of the information processing device for performing communication.

2. Description of the Related Art

In general, a portable information processing device, such as smart phones and the like, has an imaging device such as camera mounted thereon. Such an information processing device is capable of identifying a person by a face recognition technology from an image imaged by the imaging device. Also, Japanese Patent Application Laid-open No. 2011-172089 discloses a technology for identifying a communication device owned by an identified person as a communication counterpart. In Japanese Patent Application Laid-open No. 2011-172089, correspondence between a face image and the communication device owned by the person of the face image is previously stored in the information processing device. The information processing device identifies the communication device owned by the person of the face image based on the face image recognized from the image imaged by the imaging device and the content stored. The identified communication device is decided to be a communication counterpart of the information processing device.

The owner of the information processing device sometimes browses the image displayed on a display screen of the information processing device with other parson. At this time, the owner may transmit image data of the image being browsed from the owner's information processing device to a communication device owned by a person other than the owner.

For example, in a situation where a user A and a user B are browsing photograph together, the user A may provide the photograph being browsed from a smart phone owned by the user A (smart phone A) to a smart phone owned by the user B (smart phone B). In this case, in Japanese Patent Application Laid-open No. 2011-172089, the user A is required to image the user B with the smart phone A under a predetermined imaging condition and identify the smart phone B as a communication counterpart. Such procedure is troublesome for the user A, since this requires temporarily stopping browsing the photograph and preparing imaging condition to image the user B. Further, if, after identifying the communication counterpart, communication is made possible with simple and intuitive operation, the operability of the smart phones is enhanced.

SUMMARY

According to an aspect of the present disclosure, an information processing device includes an imaging unit, a storage unit configured to store a registered face image of an owner of the information processing device in association with the information processing device, and to store a face image of each of at least one person excluding the owner in association with the communication device owned by each of the at least one person, an identification unit configured to detect face images of a plurality of persons from an image imaged by the imaging unit and to identify, with reference to the registered face images stored in the storage unit, the person corresponding to the detected face image, and a decision unit configured to decide, if the owner is an identified person, a person owning a communication device that is to be a communication counterpart as a receiver from identified persons identified by the identification unit, wherein the owner is excluded from being determined a receiver.

Further features of the present disclosure will become apparent from the following description of exemplary embodiments (with reference to the attached drawings).

BRIEF DESCRIPTION OF THE DRAWINGS

FIGS. 13A to 13D are diagrams illustrating image including receiver's face image.

DESCRIPTION OF THE EMBODIMENTS

An exemplary embodiment is described in detail with reference to the drawings. Note that, the configuration described in the following descriptions is only an example and the configuration described in the exemplary embodiment(s) is not seen to be limiting.

First Embodiment

Figure 1A:
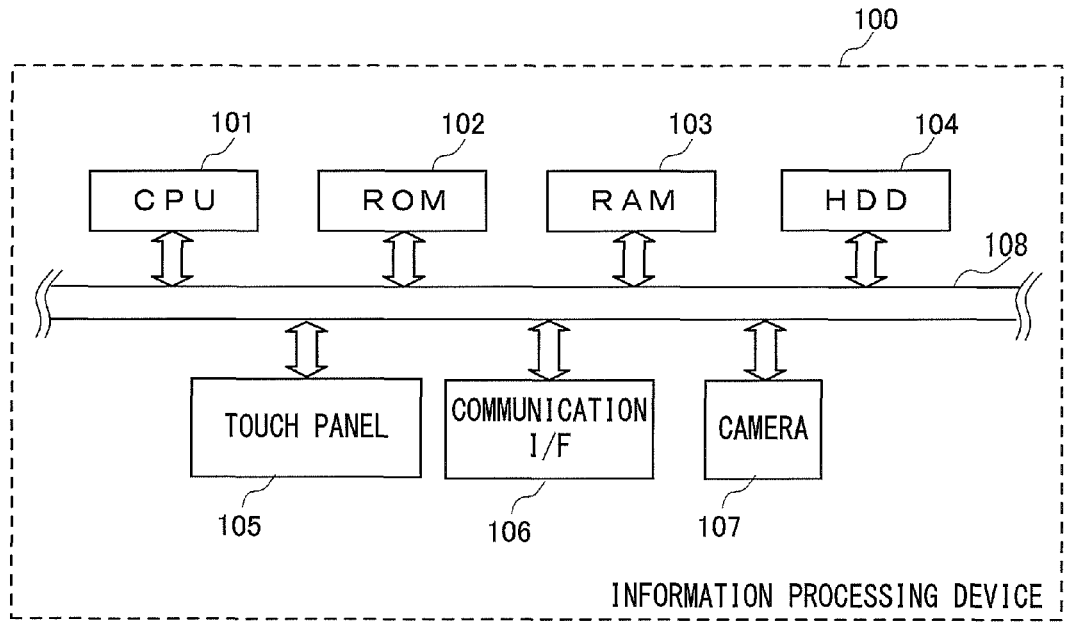
FIG. 1A is a hardware configuration diagram of an information processing device and FIG. 1B is a functional block diagram of the information processing device.

FIG. 1A is a hardware configuration diagram of an information processing device 100 according to a present embodiment. The information processing device 100 is realized, for example, by a device comprising communication function and imaging function such as smart phones, tablet PCs (Personal Computer) and the like.

A central processing unit (CPU) 101 controls each component of the information processing device 100. The CPU 101 executes computer program loaded from a read only memory (ROM) 102 to perform calculation or logic judgment for controlling each component of the information processing device. A random access memory (RAM) 103 is used as a work area when the CPU 101 executes the computer program. The ROM 102 is a memory for storing various computer programs for controlling each component. Note that the CPU 101 may download and execute computer program from an external storage device connected to the information processing device 100.

A hard disk drive (HDD) 104 is one example of the external storage device. The HDD 104 stores above-mentioned computer program and each electronic data. Note that, besides the HDD 104, SSD can be used as the external storage device. Also, the external storage device may be realized with a medium (storage medium) and an external storage drive for realizing access to the medium. The medium includes flexible disk (FD), CD-ROM, DVD, USB memory, MO, flash memory etc. Further, the external storage device may be provided in a server device connected through a network.

A touch panel 105 is an input and output (I/O) device which is provided on one surface of the information processing device 100 and which a display and a position input device such as a touch pad are combined. The touch panel 105 displays various images thereon and obtains instructions through user's operation. Through any known communication technology, a communication interface (I/F) 106 performs by wired or wireless bi-directional communication with other information processing device, communication device or external storage device and the like. In this embodiment, as one example, transmitting and receiving data to and from a communication counterpart is made possible through wireless local area network (LAN). In addition to direct communication, indirect communication via relaying apparatus is also possible with other communication device. A camera 107 is an imaging device for obtaining image or video of a person. The camera 107 of the present embodiment is a main camera provided on a back side of the information processing device 100 and an in-camera provided on a display side of the touch panel 105. It means that the in-camera is provided at a position and in a direction capable of photographing a person's face who is going to browse a display (display screen).

The CPU 101, ROM 102, RAM 103, HDD 14, touch panel 105, communication I/F 106, and camera 107 are connected so as to enable mutual transmission and reception of data via a system bus 108.

Figure 1B:
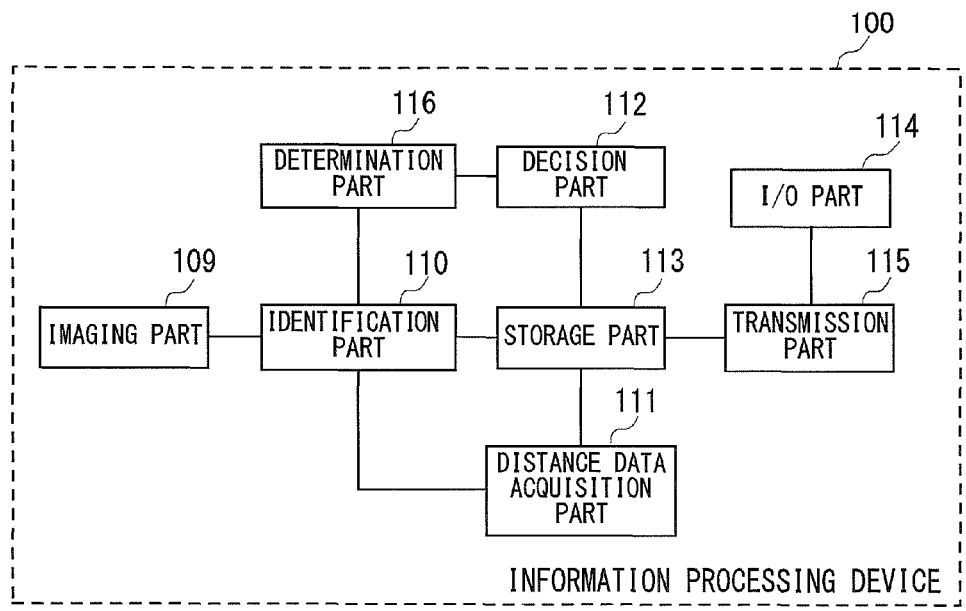

FIG. 1B illustrates a functional block diagram illustrating functions formed in the information processing device 100. Each function is realized by reading and executing a computer program from the ROM 102 by the CPU 101. In the information processing device 100, an imaging part 109, an identification part 110, a distance data acquisition part 111, a decision part 112, a storage part 113, an I/O part 114, a transmission part 115, and a determination part 116 are formed. Note that, in this embodiment, each functional block is realized through software, which, however, may be realized through hardware.

In the information processing device 100, an owner of the information processing device 100 is identified from an image including two or more persons imaged by the camera 107. Further, the information processing device 100 identifies person or persons other than the owner, who is also imaged and photographed at the same time with the identified owner. The information processing device 100 determines a receiver from those other than the identified owner. The communication device owned by the receiver is decided to be a communication counterpart.

The imaging part 109 is realized by the camera 107, which transmits the image data of the image imaged by the camera 107 to the identification part 110.

The identification part 110 performs a process for identifying a person or persons in the image by the image data received from the imaging part 109. The identification part 110 identifies a person through detection of face image by any known face recognition technology. Also, the identification part 110 is capable of tracking the detected face image. If the face image of the owner is photographed in the image previously obtained, the identification part 110 can track the image and identify as the owner.

The distance data acquisition part 111 acquires distance from the information processing device 100 (camera 107) to the person identified in the identification part 110 as a distance data. In the present embodiment, the distance data acquisition part 111 acquires an area of the face image as a distance data, the area of the face image representing that in the image by the image data received from the imaging part 109.

Note that the distance data acquisition part 111 may adapt any method to acquire the distance data as long as it can identify distance from the information processing device 100 to the person in the image. For example, the distance data acquisition part 111 is able to acquire distance data based on how the face image in the image is irradiated with light. In this case, the distance data acquisition part 111 detects brightness (illuminance) of a region in which each face image exists. The degree of brightness is used as the distance data. Depending on the brightness around the information processing device 100, the information processing device 100 may comprise illumination mechanism for illuminating person's face. By illuminating the person's face with the illumination mechanism, the distance data acquisition part 111 can easily detect the difference in brightness. Further, the distance data acquisition part 111 may detect how a portion of the face image and/or a body image are overlapped in the image. Then, through a combined use of a method for correcting distance data in accordance with how the images are overlapped, the distance data acquisition part 111 may identify the distance. For example, it is possible to find out the order of distance from the information processing device 100 to each person based on how the persons' face images are overlapped in the image. The distance data acquisition part 111 corrects the distance data so as not to cause any inconsistency in the order of distance. In a case where the owner is detected through tracking by the identification part 110, the distance data acquisition part 111 may acquire distance data from the image data obtained in the past in which the owner is photographed.

The decision part 112 determines the receiver among persons identified in the identification part 110 using the distance data acquired in the distance data acquisition part 111. The decision part 112 identifies a person with a distance nearly equal to that of the owner based on the distance data. The identified person shall be the receiver. For example, in a case where the distance data represents the area of the face image, the decision part 112 decides a person having a first area of the face image as a receiver, the difference between the first area of the face image and the area of the face image of the owner is within a predetermined value. In a case where the distance data represents the illuminance of the face image, the decision part 112 decides a person having a first illuminance of the face image as a receiver, the difference between the first illuminance of the face image and the illuminance of the face image of the owner is within a predetermined value.

Figure 2:
FIG. 2 is a diagram illustrating a registration table.
Figure 2:
Figure 2:

The storage part 113 is realized by the RAM 103 or the HDD 104, which stores a registration table concerning person or persons registered in the information processing device 100. The registration table is used to identify person or persons in the image by the image data received from the imaging part 109. FIG. 2 illustrates a diagram illustrating the registration table. In the registration table, the owner registered in the information processing device 100 and registration data of two or more users, who are the other persons, are stored. The registration data includes a user's face image (registered face image) 309, a user ID 310 for identifying user, a device ID 311 for identifying communication device owned by the user (also called "other device"), and a flag 312 for indicating whether or not the user is the owner of the information processing device 100. In the example of FIG. 2, a user A is registered as the owner (Flag 312 is on). The user ID 310, the device ID 311 and the flag 312 are associated with the registered face image 309. The user ID 310, the device ID 311 and the flag 312 can be identified by the registered face image 309.

For example, through the comparison of the detected face image and registered face image 309 registered in the registration table, the identification part 110 identifies person in the image. The identification part 110 compares the detected face image with the registered face image 309 through any known image matching technology. For example, the identification part 110 compares the detected face image with the registered face image 309 based on the correspondence of a characteristic point.

The I/O part 114 notifies the transmission part 115 of the instruction input through the operation of the touch panel 105. Further, the I/O part 114 displays the image on the display of the touch panel 105.

The transmission part 115 transmits data in accordance with the owner's instruction notified from the I/O part 114. In this embodiment, the transmission part 115 receives instruction to transmit data from the I/O part 114. In response to the instruction, the transmission part 115 transmits data to the communication device owned by the receiver decided in the decision part 112.

The identification part 116 determines whether or not the owner is included among those identified in the identification part 110. The determination part 116 checks the state of the flag 312 included in the registration data of the person identified in the identification part 110 and determines whether or not the identified person is the owner.

Figure 3A:
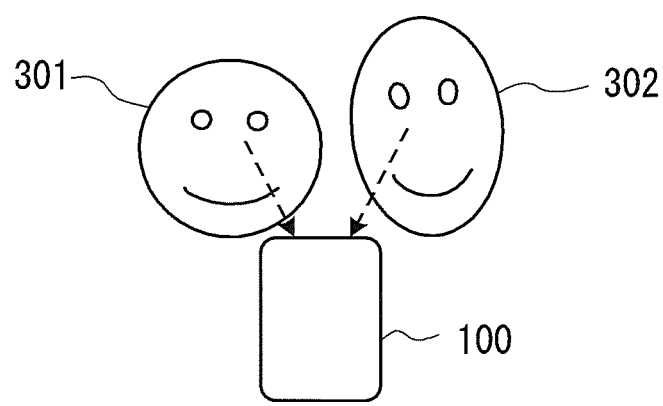
FIGS. 3A and 3B are explanatory diagrams explaining how the information processing device is utilized.
Figure 3B:
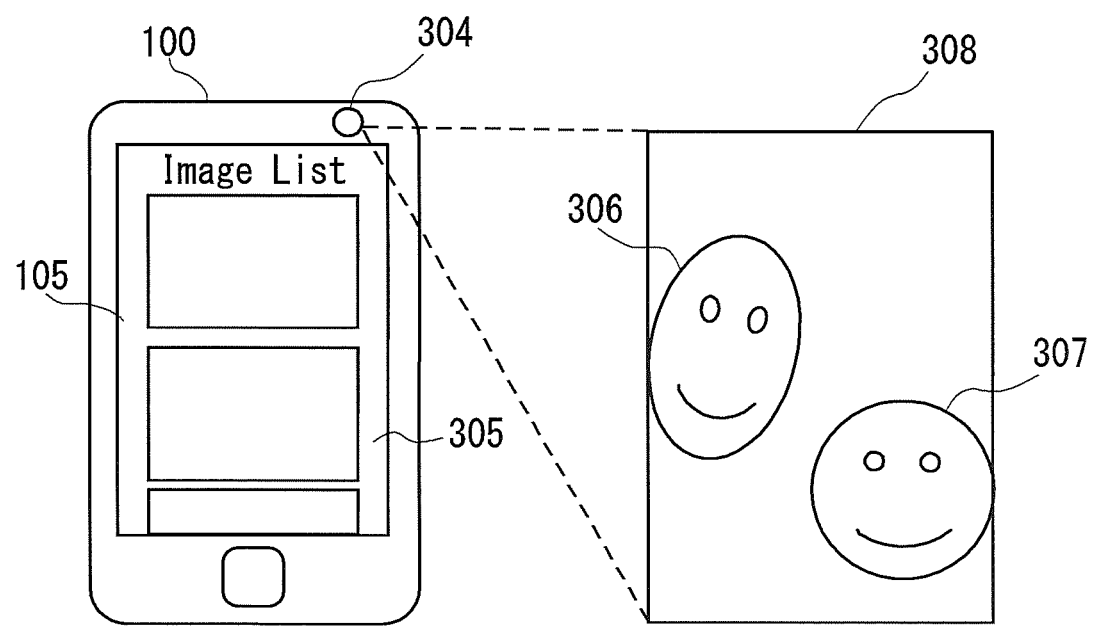

FIG. 3A and FIG. 3B illustrate explanatory diagrams specifically explaining how the information processing device 100 is utilized. FIG. 3A illustrates a diagram illustrating a situation where the user A 301, who is the owner of the information processing device 100 and the user B 302, who is not the owner of the information processing device 100 browse a list of the image displayed on the touch panel 105 of the information processing device 100.

FIG. 3B illustrates a diagram showing the information processing device 100 viewed from the user A 301 and the user B 302 sides. Further, FIG. 3B shows a situation where the user A 301 and the user B 302, browsing the image list displayed on the touch panel 105, are photographed in the image 308 imaged by the in-camera 304. In the image 308, a face image 307 of the user A 301 and a face image 306 of the user B 302 are displayed. Note that it is not necessary to display the image 308 imaged by the in-camera 304 on the touch panel 105, however, the image may be displayed in order to show a situation where the user A 301 and the user B 302 are imaged in the in-camera 304.

Figure 4A:
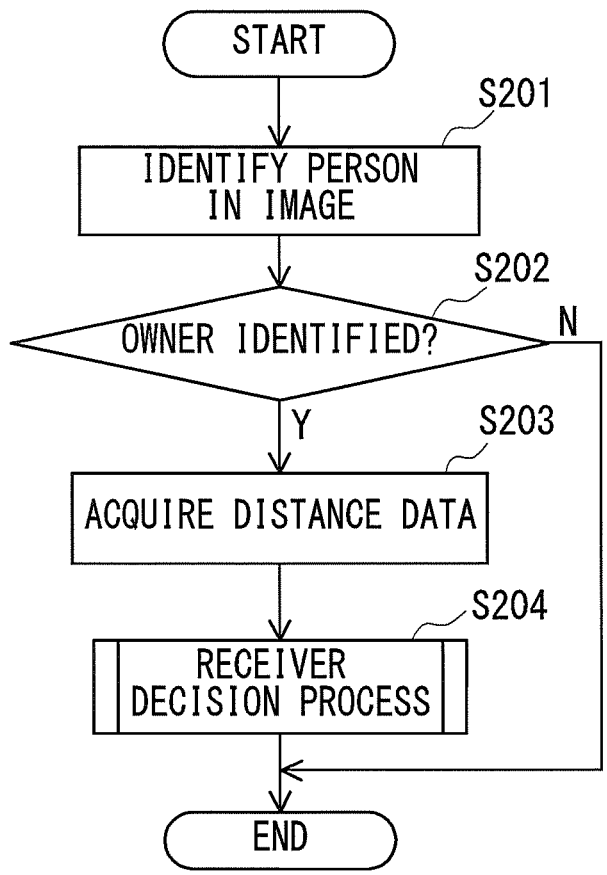
FIGS. 4A and 4B are flowcharts illustrating process for identifying a receiver.
Figure 4B:
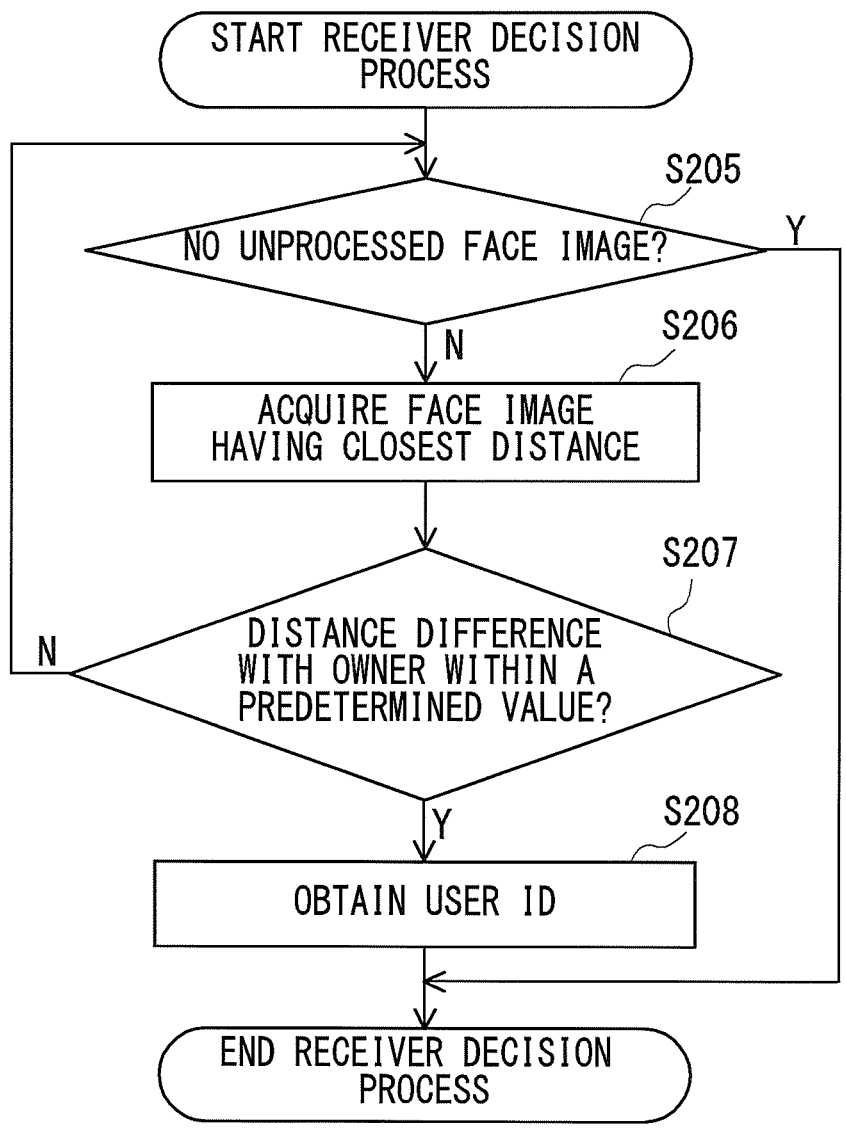

In this embodiment, description is made with regard to an example in which any one of the images in the image list displayed on the touch panel 105 is transmitted to the communication device of the receiver by the information processing device 100. FIGS. 4A and 4B are flowcharts illustrating process for identifying receiver. The process is repeatedly performed every time the image imaged by the camera 107 is updated. The process is started by start-up of given application software, start-up of the information processing device 100 or by the owner's selection of image to be transmitted. Further, inquiry to peripheral communication devices may be made via the communication I/F 106. The process may be started only when a communication device having a similar posture is detected. Note that the "posture" is pitch, roll, direction and the like of the information processing device 100 and the communication device.

The imaging part 109 transmits the image data of the image imaged by the in-camera 304 while the user A 301 and the user B 302 are browsing the image list displayed on the touch panel 105. The identification part 110 receives the image data transmitted from the imaging part 109 and identifies a person through the detection of all face images included in the image by the received image data (S201). The identification part 110 identifies a person from the face image with reference to the registration table. If no detected face image is registered in the registration table, the identification part 110 ignores the face image. If a part of the owner's face image is photographed in the image, the identification part 110 tracks and detects the subject through any known technology. Through tracking, the identification part 110 detects the owner's the face image. To this end, the identification part 110 stores the image data previously received from the imaging part 109 in the storage part 113.

When the identification of person in the image is completed by the identification part 110, the determination part 116 determines whether or not the owner is included among those identified in the identification part 110. If the owner is not included (S202: N), the CPU 101 ends the process. If the owner is included (S202: Y), the distance data acquisition part 111 acquires the distance data for every face image detected in the identification part 110.

After the acquisition of the distance data, the decision part 112 decides the receiver based on the person identified in the identification part 110 and the distance data (S204). FIG. 4B illustrates a flowchart illustrating a receiver decision process.

The decision part 112 determines whether or not the steps S205 to S207, which will be described later, have been performed with respect to the face image of the person(s) other than the owner included in the image by the image data acquired by the imaging part 109 (S205). The decision part 112 ends the receiver decision process if the process has already been performed with respect to the face image of all persons other than the owner (S205: Y).

If there are any face images unprocessed (S205: N), the decision part 112 acquires the face image of the person closest to the information processing device 100 among those other than the owner in accordance with the distance data acquired at step S203. In this embodiment, the distance is represented by the area of the face image. Therefore, the face which is other than the owner's face image, unprocessed and having largest face image among those unprocessed is acquired.

The decision part 112 determines, from the owner's face image and the face image acquired at step S206, whether or not the difference in distance therebetween is within a predetermined value (S207). If it is not within a predetermined value (S207: N), the decision part 112 goes back to the process at step S205. If the difference in distance therebetween is within a predetermined value, the decision part 112 determines that the owner and the person of the face image are located at almost the same distance from the information processing device 100. Then, the decision part 112 decides the person as the receiver (S207: Y).

The distance is represented by an area of the face image. Therefore, the area of the owner's face image is set to "Sa", the area of the face image acquired at step S206 is set to "Sb", and the predetermined value is set to "D". The decision part 112 determines whether or not the distance is within a predetermined value by the following expression.

$$D > |Sa - Sb| \quad \text{(Formula 1)}$$

Note that, when the person is identified through tracking at step S201, the (Formula 1) may always be satisfied by setting the predetermined value "D" to be infinite. Also, to decide a person (user B 302 in FIG. 3A) adjacent to the owner (user A 301 in FIG. 3A) to be the receiver, the receiver may be decided based, not only on the difference in distance, but also on the direction of the owner's face image and the face image acquired at step S206. In this case, the decision part 112 digitizes the direction of the face image for the determination. The direction of the owner's face image is set to value "Aa", the direction of the face image acquired at step S206 is set to value "Ab", and the predetermined value is set to "A". When the following relation is satisfied, for example, the decision part 112 determines that the distance is within a predetermined value.

$$A > |Aa - Ab| \quad \text{(Formula 2)}$$

The decision part 112 acquires a user ID of the person decided to be the receiver from the registration table in the storage part 113 (S208). The decision part 112 acquires the user ID with reference to the registration table in accordance with the face image of the person (obtained at step S206) decided to be the receiver at step S207. The decision part 112 stores the acquired user ID in the storage part 113 and ends the process.

Through the processes as mentioned above, the receiver can be identified. The transmission part 115 is capable of identifying the communication device owned by the receiver with reference to the device ID 311 registered in the registration table, based on the stored user ID. The communication is made possible between the information processing device 100 and the identified communication device. In this embodiment, by identifying identification information on wireless LAN, it is possible to establish communication with the identified communication device. The transmission part 115 transmits the image data being browsed to the identified communication device when instruction to transmit data is given from the I/O part 114. This allows the receiver to obtain the image. Note that other than the image data, any data is transmittable as long as it is electronically handled. Note that when e-mail address etc., is used as the device ID 311, the transmission part 115 may send data through e-mail.

FIGS. 5A to 5D are explanatory diagrams explaining specific operation forms. FIGS. 5A to 5D illustrate position relation between the information processing device 100 and its owner, the user A 301, and the image imaged (obtained) by the in-camera 304 at the time.

Figure 5A:
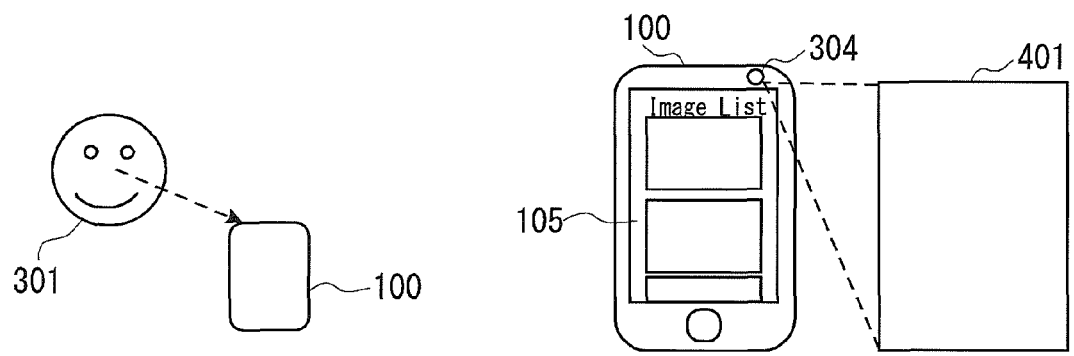
FIGS. 5A to 5D are explanatory diagrams explaining operation form of the information processing device.

FIG. 5A shows a state where the owner, i.e., the user A 301 browses the image displayed on the touch panel 105 of the information processing device 100 alone at a slight distance from the information processing device 100. The image 401 imaged by the in-camera 304 does not include the face image of the user A 301. In this case, the owner's face image is not detected at step S201 in FIG. 4A so that the identification process of the receiver is ended. The information processing device 100 repeatedly performs the process until the owner's face is imaged by the in-camera 304.

Figure 5B:
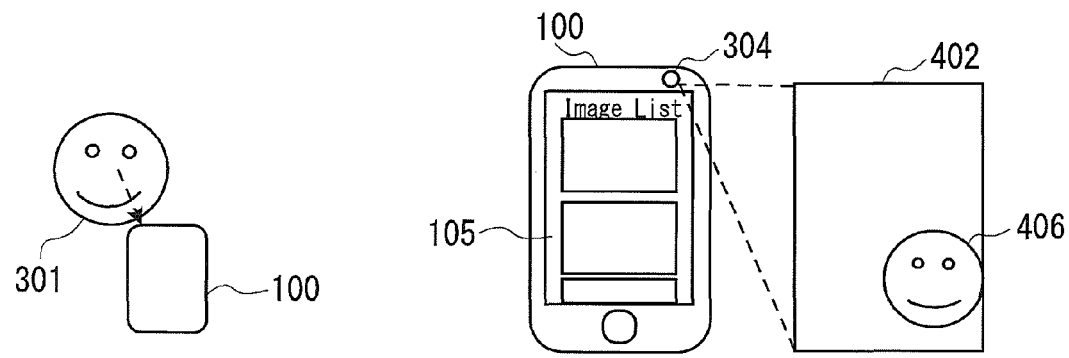

FIG. 5B shows a state where the owner, the user A 301 browses the image displayed on the touch panel 105 of the information processing device 100 alone. The image 402 imaged by the in-camera 304 includes the face image 406 of the user A 301. In this case, the face image 406 of the user A 301 is detected at step S201 in FIG. 4A and the owner is identified (S202: Y). The distance data acquisition part 111 acquires the distance data from the identified owner to the information processing device 100 (S203). Since the face image other than the owner has not been detected in the receiver decision process, the decision part 112 then ends the process (S205: Y, FIG. 4B). When the owner is operating the information processing device 100 alone as above, the receiver is not identified.

Figure 5C:
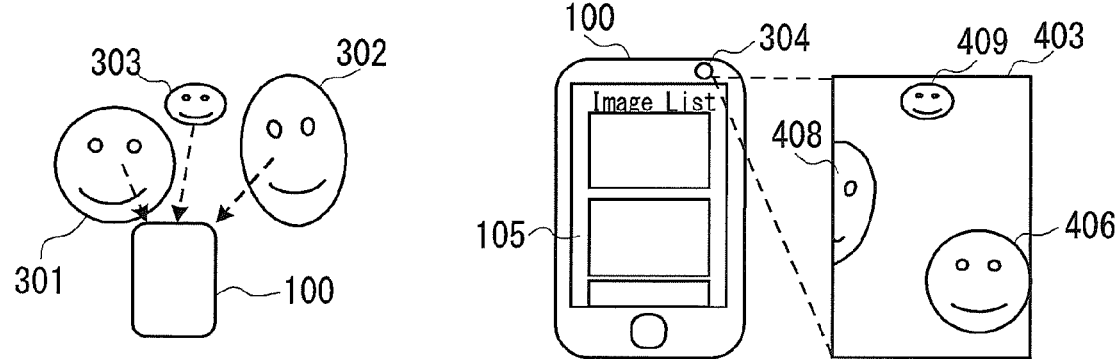

FIG. 5C shows a state where the owner, the user A 301 and the other persons, the user B 302 and the user C 303 browse the image displayed on the touch panel 105 of the information processing device 100. The image 403 imaged by the in-camera 304 includes the face images 406, 408 and 409, respectively corresponding to the user A 301, the user B 302, and the user C 303. The face image 408 of the user B 302 is a part of the face image. Therefore, the identification part 110 cannot detect the face image 408 of the user B 302 as the face image. Further, the user C 303 have a distance, from the information processing device 100, which is not deemed almost equal to that from the user A 301 to the information processing device 100.

In this case, the face images 406 and 409 of the user A 301 and the user C 303 respectively are detected at step S201 in FIG. 4A and the user A 301 and the user C 303 are identified. Since the owner (user A 301) has been identified (S202: Y), the distance data acquisition part 111 acquires the distance data from the identified owner to the information processing device 100 and the distance data from the user C 303 to the information processing device 100 (S203). The distance data is represented as an area of the face image. Therefore the distance data acquisition part 111 acquires "Sa", representing the area of the owner's (user A 301) face image 406 and "Sc", representing the area of the face image 409 of the user C 303.

In the receiver decision process, the decision part 112 acquires the face image 409 of the user C 303 as the face image whose distance from the information processing device 100, other than the owner, is shortest (S206 in FIG. 4B). Based on the "Sa", representing the area of the owner's face image 406 and the "Sc", representing the area of the face image 409 of the user C 303, the decision part 112 makes determination through the (Formula 1). Here, the "Sc", representing area of the face image 409 of the user C 303 does not satisfy the (Formula 1). Since no face image other than the face image 406 of the owner and the face image 409 of the user C 303 has been detected from the image 403, the decision part 112 ends the process (S 205: Y, FIG. 4B). As above, even in case of FIG. 5C, the receiver is not identified. The person, like the user C 303, at a position considerably away from the information processing device 100, cannot be the receiver.

Figure 5D:
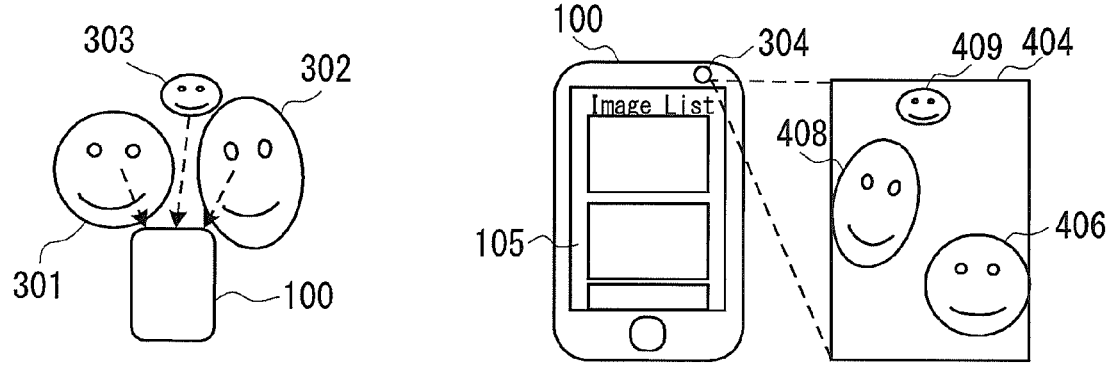

FIG. 5D shows a state where the owner, the user A 301 and other persons, the user B 302, the user C 303 browse the image displayed on the touch panel 105 of the information processing device 100. The image 404 imaged by the in-camera 304 includes the face images 406, 408, and 409, respectively corresponding to the user A 301, the user B 302, and the user C 303. The user B 302 is away from the information processing device 100, the distance from the user B 302 to the information processing device 100 being deemed almost equal to that from the user A 301 to the information processing device 100. Further, the face image 409 of the user C 303 is, similar to the case of FIG. 5C, away from the information processing device 100, the distance from the user C 303 to the information processing device 100 being not deemed almost equal to that from the user A 301 to the information processing device 100.

In this case, the face images 406, 408 and 409 of the user A 301, the user B 302 and the user C 303 respectively are detected at step S201 in FIG. 4A and the user A 301, the user B 302 and the user C 303 are respectively identified. Since the owner (user A 301) has been identified (S202: Y), the distance data acquisition part 111 respectively acquires the distance data from the identified owner to the information processing device 100, the distance data from the user B 302 to the information processing device 100, and the distance data from the user C 303 to the information processing device 100 (S203). The distance data is represented as an area of the face image. Therefore, the distance data acquisition part 111 acquires "Sa", representing the area of the owner's (user A 301) face image 406, "Sb", representing the area of the face image 408 of the user B 302 and "Sc", representing the area of the face image 409 of the user C 303.

In the receiver decision process, the decision part 112 acquires the face image 408 of the user B 302 as the face image at the shortest distance from the information processing device 100 excluding the owner (S206 in FIG. 4B). Based on "Sa", which is the area of the owner's face image 406 and "Sb", which is the area of the face image 408 of the user B 302, the decision part 112 makes determination through the (Formula 1). Here, "Sb", which is the area of the face image 408 of the user B 302 satisfies the (Formula 1). The decision part 112 decides the user B 302 as the receiver, acquires the user ID of the user B 302 from the registration table and then ends the process.

In case of FIG. 5D, the receiver is decided as above. This enables to determine the user B 302, who is almost equal distance to the owner, as the receiver, even in a case where a plurality of users simultaneously browse the touch panel 105 of the information processing device 100.

The communication device owned by the receiver may be of the same configuration as that of the information processing device 100 of the present embodiment. In this case, when establishing communication, the owner's user ID is transmitted from the transmission side information processing device 100 to the reception side information processing device. The reception side information processing device having received the owner's user ID executes the processes as shown in FIGS. 4A and 4B. Note that in a case where the reception side information processing device executes the processes as shown in FIGS. 4A and 4B, the "owner" of each process becomes the owner of the reception side information processing device.

Through the execution of the processes as shown in FIGS. 4A and 4B, the reception side information processing device obtains the user ID in the process of step S208. The reception side information processing device compares the user ID obtained in the process of step S208 with the owner's user ID received from the owner side information processing device. If both match as the result of the comparison, the reception side information processing device accepts connection to the owner side information processing device.

Further, a plurality of users may be decided as the receivers. In this case, after the step S208 in FIG. 4B, the process goes back to step S205 and the processes are repeatedly executed.

As mentioned above, in the first embodiment, based on the owner photographed in the in-camera 304, a person who is almost the equal distance to the owner is set to be the receiver. Therefore, the user who is browsing the information processing device with the owner can be determined as the receiver easily.

Second Embodiment

Description was made in the first embodiment in a case where the entire face of the owner is imaged by the in-camera 304. However, it is not always the case where the in-camera 304 is capable of imaging the entire face of the owner. The second embodiment is capable of identifying the owner and the receiver even in a case where the owner's face is partially imaged. The hardware configuration of the information processing device for the second embodiment is similar to that of the first embodiment. Therefore, the description will be omitted. As to the functional block formed in the information processing device, there is a difference between that formed in the first and second embodiments.

Figure 6:
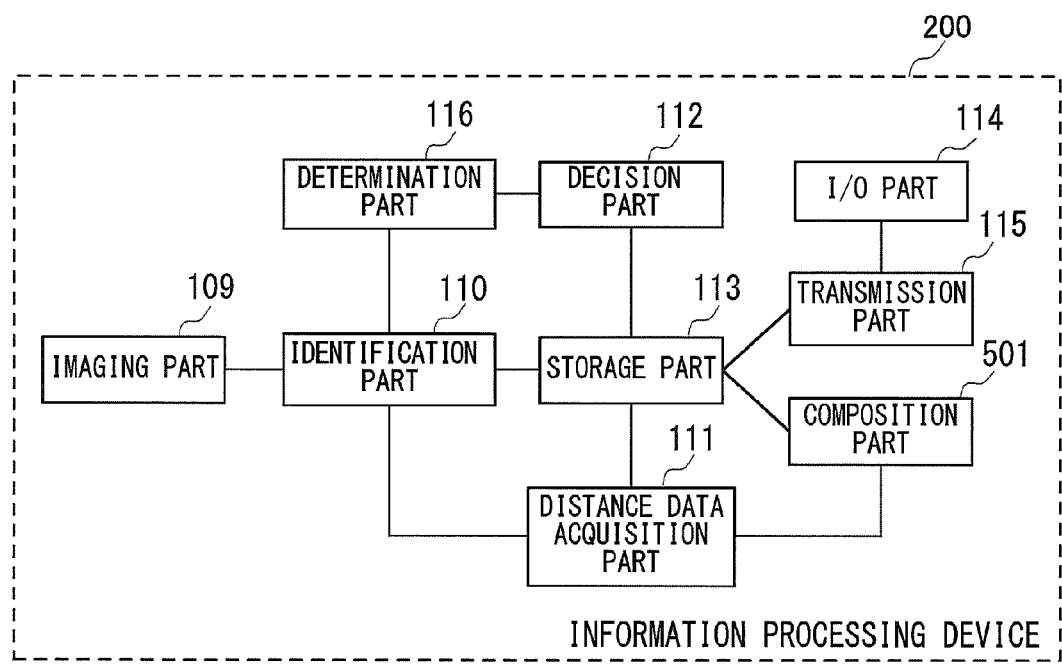
FIG. 6 is a functional block diagram of the information processing device.

FIG. 6 illustrates a functional block diagram of the information processing device 200 of the second embodiment. The functional block formed in the information processing device 200 is configured such that a composition part 501 is added to the functional block formed in the information processing device 100 of the first embodiment. Other functional blocks are similar to those of the first embodiment so that the descriptions thereof will be omitted. The composition part 501 generates composite image through a composition of the image previously imaged by the camera 107 with the latest image currently being processed. Therefore, the composition part 501 is able to store the image data in the storage part 113. Also, it can read the image data from the storage part 113.

Figure 7A:
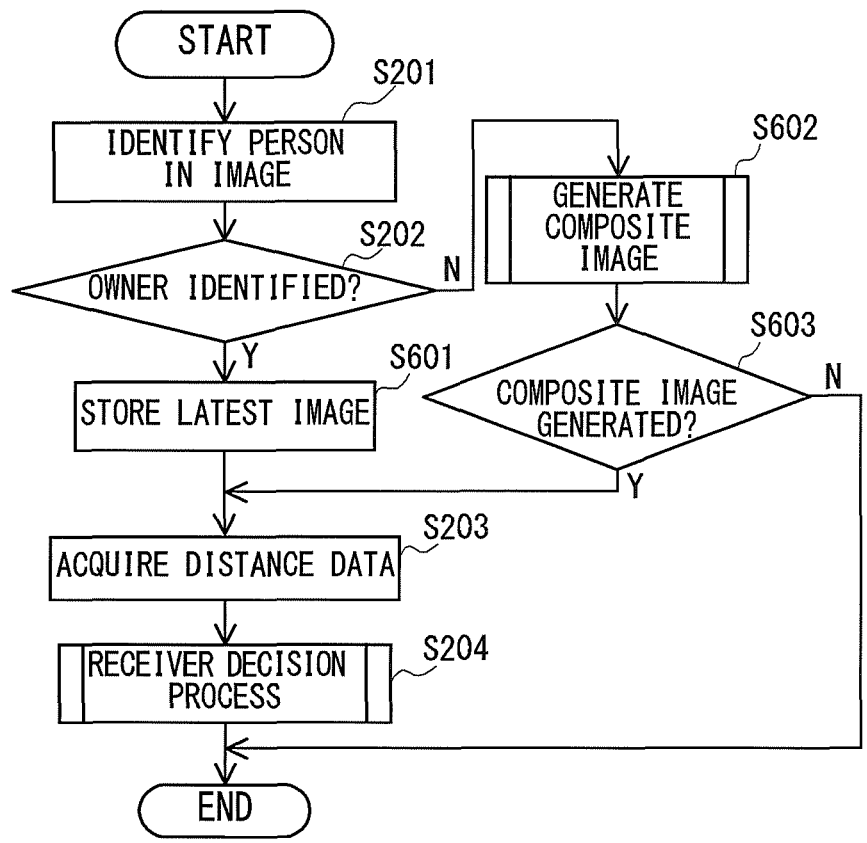
FIGS. 7A and 7B are flowcharts illustrating process for identifying a receiver.
Figure 7B:
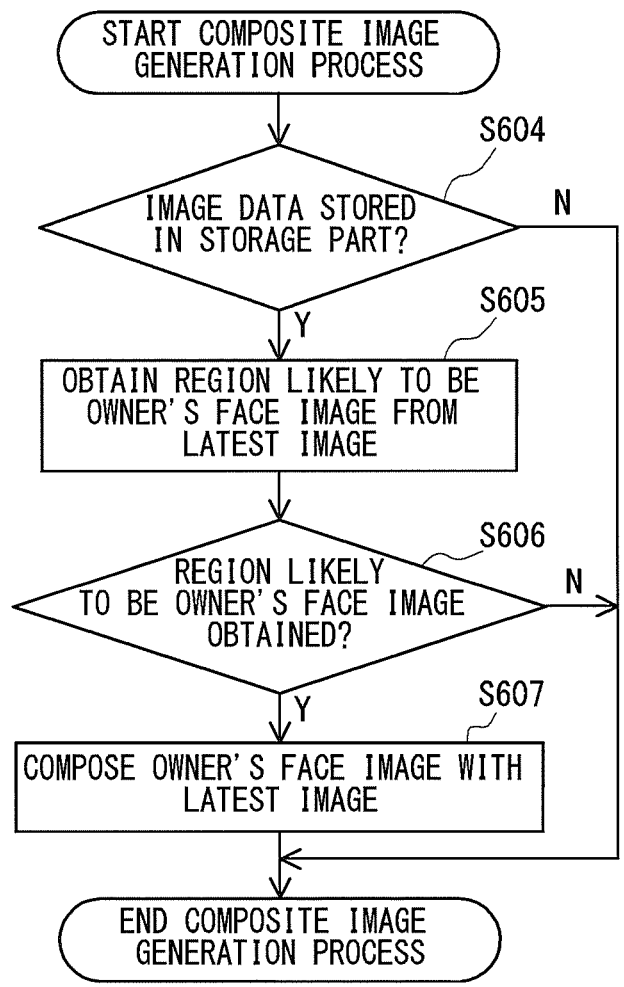

FIGS. 7A and 7B are flowcharts illustrating processes for identifying receiver of the second embodiment. In FIG. 7A, the same step numbers are assigned to the steps identical to those shown in FIG. 4A of the first embodiment.

In a case where the owner is photographed in the image of the image data received from the imaging part 109 (S201, S202: Y), the composition part 501 stores the image data of the image having photographed therein is the owner's face in the storage part 113 (S601). It is sufficient that the latest image data having photographed therein is the owner's face is stored in the storage part 113. Therefore, if there is the image data having already been stored in the storage part 113, the composition part 501 may delete the image data. Similar to the first embodiment, after storing the image data, the information processing device 200 identifies the receiver through the acquisition of the distance data and execution of the receiver decision process (process in FIG. 4B).

If the owner is not photographed in the image by the image data received from the imaging part (S201, S202: N), the composition part 501 generates the composite image through the composition of the image (S602). The composition part 501 generates composite image through composition of the image having photographed therein is the owner's face stored in the storage part 113 with the latest image currently being processed.

Similar to the first embodiment, after generating the composite image (S603: Y), the information processing device 200 identifies the receiver through the acquisition of the distance data and execution of the receiver decision process (process in FIG. 4B). Note that if the composite image is not generated by reason that the image data is not stored in the storage part 113 (S603: N), the information processing device 200 ends the process.

The process for generating the composite image is described with the flowchart in FIG. 7B.

The composition part 501 checks whether or not the image data is stored in the storage part 113 (S604). If the image data is not stored in the storage part 113 (S604: N), the composition part 501 ends to generate the process for composing image. If the image data is stored in the storage part 113 (S604: Y), the composition part 501 obtains "region likely to be the owner's face image" from the latest image currently being processed (S605).

In a case where the "region likely to be the owner's face image" is obtained, the composition part 501 first detects a region where a flesh color (person's skin color) component exists (flesh-color region) from the latest image currently being processed. The composition part 501 compares the position of the detected flesh-color region with the position of the region of the owner's face image in the image by the image data read from the storage part 113. If the position difference therebetween is within a predetermined value, the detected flesh-color region is determined to the "region likely to be the owner's face image".

Other than this, as a method to obtain the "region likely to be the owner's face image", it is possible to store the region of the owner's face image included in the past image in the storage part 113 and estimate the region likely to be the face image by the transition of the region.

In a case where the region likely to be the owner's face image cannot be obtained (S606: N), the composition part 501 ends to generate the process for composing image. In a case where the region likely to be the owners face image is obtained (S606: Y), the composition part 501 generates the composite image through composition of the latest image currently being processed with the owner's face image (S607). The composition part 501 makes composition through the use of the region likely to be the owner's face image obtained at step S605 and the owner's face image, which is obtained by cutting from the image by the image data stored in the storage part 113 at step S601. For composition, the owner's face image is overlapped with the region likely to be the owner's face image.

For example, when composing images, the composition part 501 uses a vertex, located farthest from the border of an imaging range in the area likely to be the face image of the owner, as a reference of position alignment. For example, in a case where the owner's left half of the face image is photographed in the latest image currently being processed, the composition part 501 obtains the left half of the region likely to be the owner's face image from the latest image. In this case, the composition part 501 uses the region likely to be the owner's face image and left upper coordinates of the region of the owner's face image as a reference of position alignment, the owner's face image being obtained from the image data stored in the storage part 113. Similarly, in a case where the owner's right half of the face image is photographed in the latest image currently being processed, the composition part 501 uses the region likely to be the owner's face image and right upper coordinates of the region of the owner's face image as a reference of position alignment, the owner's face image being obtained from the image data stored in the storage part 113.

The composition part 501 makes the size of the region likely to be the owner's face image equal to that of the owner's face image for composition, the owner's face image being obtained by cutting from the image data stored in the storage part 113.

When composing images, instead of using the vertex located farthest from the border of the imaging range, the composition part 501 may use the center point of the region likely to be the owner's face image and the center point of the region of the owner's face image as a reference of position alignment, the owner's face image being obtained from the image data stored in the storage part 113. Further, before the position alignment, the size of the region likely to be the owner's face image is made equal to that of the owner's face image, the owner's face image being obtained by cutting from the image data stored in the storage part 113. Then, the position alignment may be made by matching the characteristic points in each image.

Figure 8A:
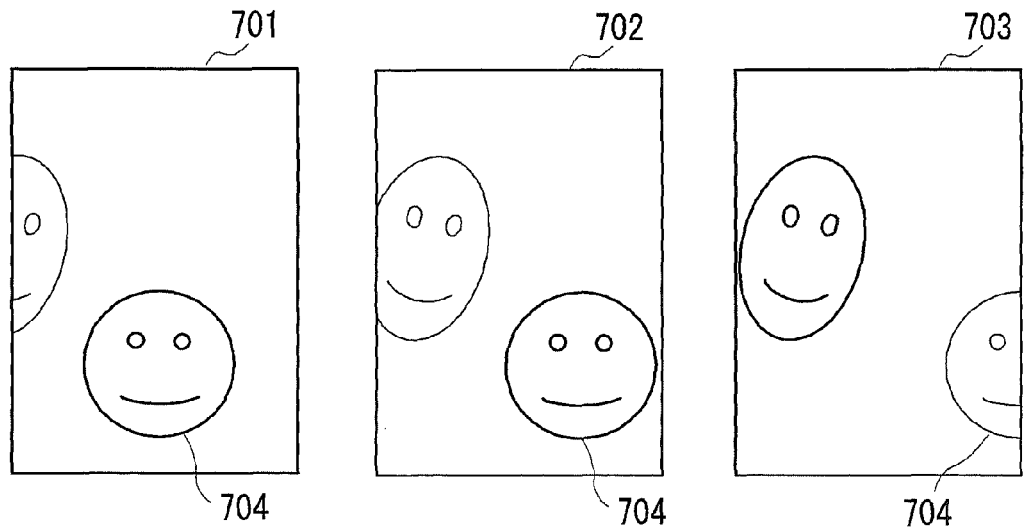
FIGS. 8A and 8B are explanatory diagrams explaining process for generating a composite image.
Figure 8B:
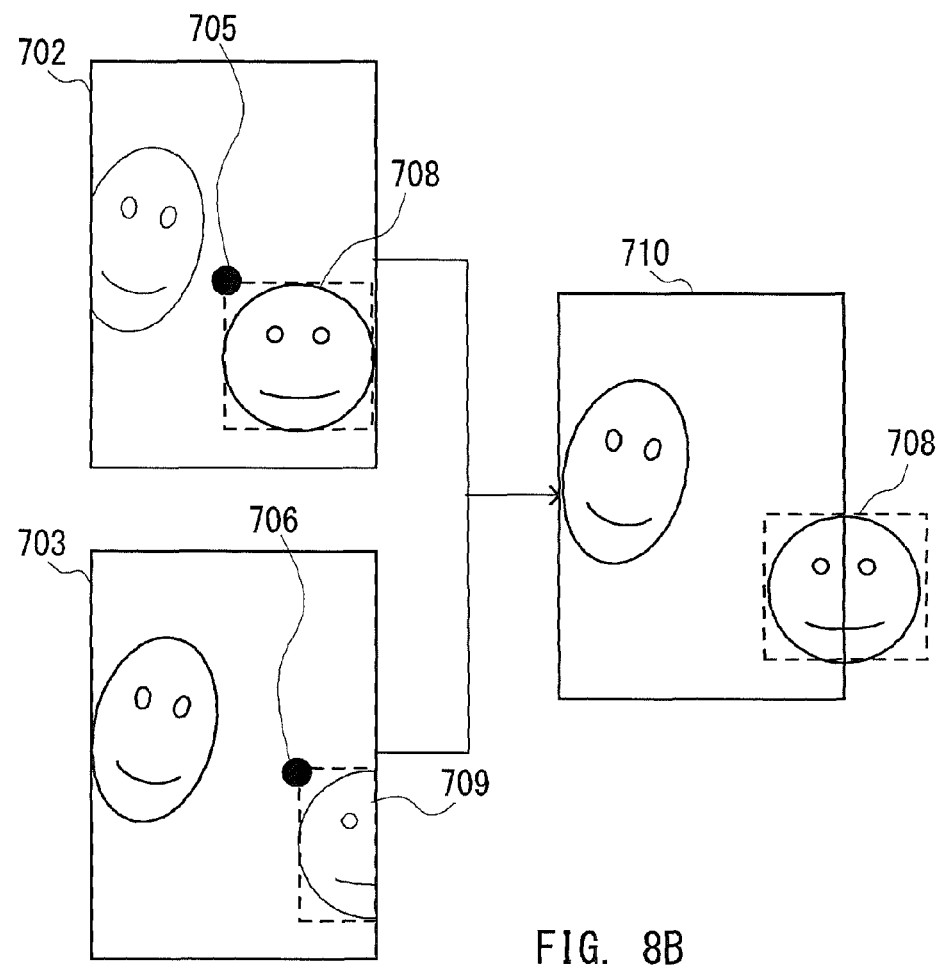

As above, the process to generate the composite image is ended. FIGS. 8A and 8B are diagrams for explaining the process for generating the composite image.

FIG. 8A illustrates a diagram illustrating the consecutive images imaged (obtained) by the in-camera 304. In an image 701, the entire face image 704 of the owner is photographed. As it moves to an image 702 and an image 703, the owner's face image 704 is shifted to the right. In the image 703, only about right half of the owner's face image 704 is photographed. The information processing device 200 can detect the owner's face image 704 from by the images 701 and 702 whereas it cannot detect by the image 703. Such a circumstance occurs in a case, for example, where the image displayed on the touch panel 105 of the information processing device 200 is directed to person or persons browsing the image together.

In case of the image 701, the owner's face image 704 is detected. Therefore, the composition part 501 stores the image data of the image 701 in the storage part 113 in the process at the step S601 in FIG. 7A. The same applies when processing the image 702. When storing the image 702 in the storage part 113, the composition part 501 removes the previously stored image data of the image 701 from the storage part 113.

In case of the image 703, the owner's face image 704 is not detected. Therefore, the composition part 501 generates the composite image in the process of step S602 in FIG. 7A. The composition part 501 checks whether or not the image data of the image when the owner's face image 704 was detected is stored in the storage part 113 (S604). The image data of the image 702 is stored (S604: Y) so that the composition part 501 acquires the vertex from the image 703, the vertex located farthest from the border of the image 703 of the region likely to be the owner's face image (S605). In case of the example in FIG. 8B, the composition part 501 obtains the vertex 706, the vertex located farthest from the border of the image 703 of the region 709 likely to be the owner's face image. Further, the composition part 501 obtains the vertex of the region of the owner's face image from the image 702 by the image data stored in the storage part 113. In case of the example in FIG. 8B, the composition part 501 obtains the vertex 705 of the region 708 of the owner's face image. If the difference in position between the vertex 706 and the vertex 705 is within a predetermined value, the region 709 likely to be the owner's face image becomes the region in which the owner's face image is displayed. The vertex represents the vertex of the region 709 likely to be the owner's face image. The vertex 705 represents the region 708 of the owner's face image.

The area 709 likely to be the owner's face image is in the latest image 703 (S606: Y) so that the composition part 501 composes the region 708 with the latest image 703, the region 708 representing the region of the face image of the owner of the image 702 by the image data stored in the storage part 113. The composition part 501 enlarges or reduces the size of the region 708 of the face image of the operator of the image 702 in accordance with the size of the region 709 likely to be the operator's face image. Then, the composition part 501 composes the image so as to overlap the vertex 706 of the image 703 with the vertex 705 of the image 702. The composition part 501 generates the composite image 710 in this way.

In the second embodiment, even in a case where only a part of the owner's face image is photographed in the latest image imaged by the in-camera, through the use of the face image previously detected, the face image is supplemented to the latest image to identify the owner so that it is possible to keep performing the process for identifying the receiver. Therefore, even in a case where the in-camera with narrow imaging range is used, it is possible to decide the receiver without being influenced by that.

Third Embodiment

In the first and the second embodiments, based on the owner photographed in the in-camera 304, a person with a distance which is almost equal to that of the owner is identified to be the receiver. The communication device owned by the receiver becomes the communication counterpart. After identifying the communication counterpart, if, for example, data transmission is possible through the touch operation (drag), simple and intuitive communication becomes possible, the touch operation being made in a direction of the communication counterpart by the owner through the use of the touch panel of the information processing device. Therefore, it is necessary for the information processing device to identify the direction (position) of the communication counterpart with respect to the information processing device. In the third embodiment, communication is performed by identifying the direction of such communication counterpart.

Figures 9, 10:
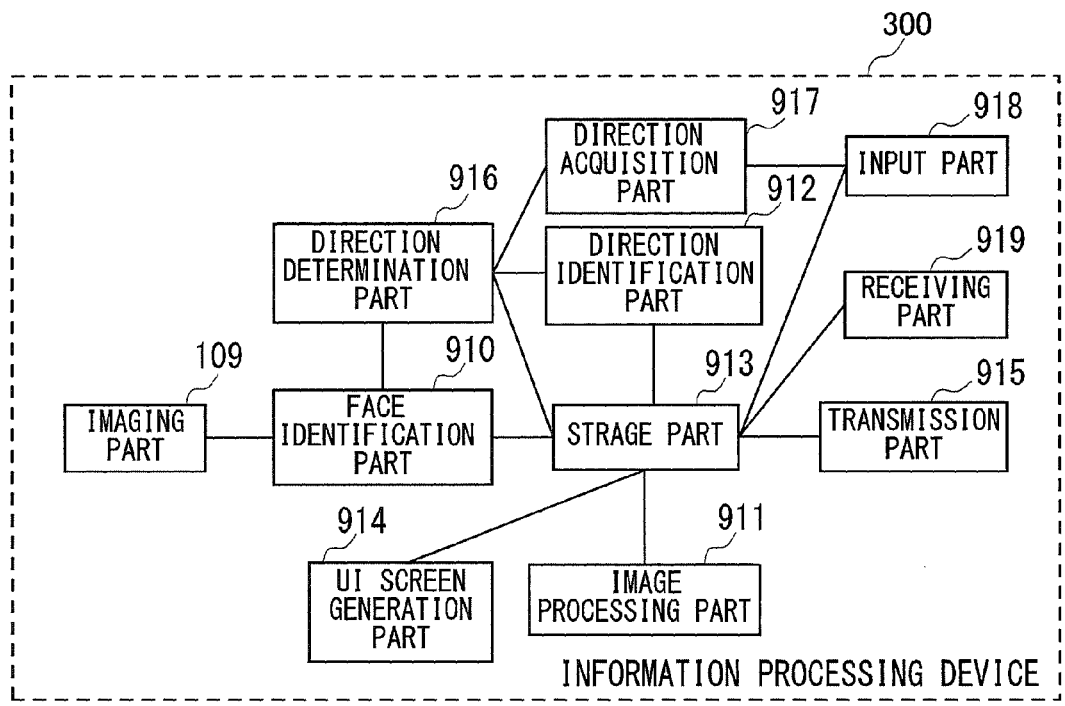
FIG. 9 is a functional block diagram of the information processing device.
FIG. 10 is a diagram illustrating a registration table.

FIG. 9 illustrates a functional block diagram illustrating function formed in the information processing device 300. The hardware component of the information processing device 300 is similar to that of the information processing device 100 of the first and the second embodiments. Therefore, the description thereof will be omitted. Each function is realized by reading and executing a computer program from the ROM 102 with the CPU 101. The information processing device 300 forms an imaging part 109, a face identification part 910, an image processing part 911, a direction identification part 912, a storage part 913, a user interface (UI) screen generation part 914, a transmission part 915, a direction determination part 916, a direction acquisition part 917, an input part 918 and a receiving part 919. Note that, in the present embodiment, each functional block is realized by software, it however may be realized by hardware. As described in the first and the second embodiment, the information processing device 300 identifies person or persons from the image imaged by the camera 107 and decides the receiver among those identified. The communication device owned by the receiver becomes the communication counterpart. Further, the information processing device 300 identifies the direction of the communication device which becomes the communication counterpart with respect to the information processing device 300 in accordance with the displayed area of the person in the image imaged by the camera 107. In order to realize such processes, each function block is formed. Note that the communication device as the communication counterpart is a device comprising of a display function and a communication function. For example, the other information processing device 300 may be the communication counterpart.

The imaging part 109 transmits the image data of the image imaged by the camera 107 to the face identification part 910. Similar to the identification part 110 of the first and the second embodiments, the face identification part 910 performs process for identifying a person in the image by the image data received from the imaging part 109. The face identification part 910 detects the face image through any known face recognition technology to identify the person.

The image processing part 911 performs image processing, including identification of the display area of the face image of the person identified in the face identification part 910, detection of center coordinates of the display region of the face image, detection of the position of organs of the face image such as eyes, nose (organ detection) and the like. The image processing as above is also realized through the use of any known technology. Note that the display region of the face image is hereinafter referred to as "face region". The display region of the face image represents a face outline and its inner region by the face image. Further, the display region of the face image may be a rectangular region, circular region and the like including the face image therein.

The direction identification part 912 decides position relation (relative direction) between the information processing device 300 and the communication device through the use of the result obtained by the image processing performed by the image processing part 911, the communication device being owned by the person (receiver) identified in the face identification part 910.

The UI image generation part 914 generates the UI screen for transmitting electronic data based on the owner's touch operation (touch, drag and the like) on the touch panel 105. The direction determination part 916 compares the direction of the communication device owned by the receiver and the direction of the touch operation with respect to the information processing device 300 and determines whether or not both match. If it is determined that both match, the direction determination part 916 causes the UI image generation part 914 to generate the UI screen representing that the electronic data will be transmitted to the communication device owned by the receiver. If it is not determined that both do not match, the direction determination part 916 causes the UI image generation part 914 to generate the UI screen representing that the electronic data will not be transmitted to the communication device owned by the receiver.

The transmission part 915 transmits data to other communication devices. In particular, in this embodiment, if the direction determination part 916 has determined that both match, the transmission part 915 transmits the electronic data and the UI image data to the communication device owned by the receiver, the UI image data representing the UI screen generated in the image generation part 914 when both match. The receiving part 919 receives data from other communication devices. In particular, in this embodiment, the receiving part 919 receives completion notice notifying that the electronic data and the UI image data have been received from the communication device owned by the receiver. The transmission part 915 and the receiving part 919 are realized by the communication I/F 106.

The input part 918 detects the user's touch operation operated through the touch panel 105. The direction acquisition part 917 acquires the operation direction (instruction direction) of the user's touch operation detected by the input part 918.

The storage part 913 is realized by the RAM 103 and HDD 104 and stores the registration table with regard to a plurality of persons registered in the information processing device 300. The owner of the information processing device 300 is registered with other persons. The registration table is used to identify the person in the image by the image data received from the imaging part 109. FIG. 10 illustrates a diagram illustrating the registration table. In the registration table, registration data of a user, who is a person to be registered in the information processing device 300, is recorded. The registration data includes user's face image for registration (registered face image) 309, user ID 310 for identifying the user, device ID 311 for identifying user's communication device, attribute data 313 representing whether the user is the sender or receiver of the electronic data. In the example of FIG. 10, the user A is registered as the sender and the user B is registered as the receiver. The user A is the owner of the information processing device 300. The receiver is the person or persons identified at the face identification part 910. Depending on the image imaged by the camera 107, the person is switched to the person (user C) other than the user B. The user ID 310, the device ID 311, and the attribute data 313 are associated with the registered face image 309. With the registered face image 309, the user ID 310, the device ID 311 and the attribute data 313 can be identified.

The face identification part 910 compares the detected face image and the registered face image 309 registered in the registration table for identifying the person in the image. The face identification part 910 compares the detected face image and the registered face image 309 through the use of any known image matching technology. For example, the face identification part 910 compares the face image and registered face image 309 in terms of the correspondence of the characteristic point.

FIGS. 11A to 11F are diagrams explaining examples in a case where image data of a photograph (displayed image) is transmitted and received through the UI screen between the information processing device 300 of the transmitter (user A 301 in FIG. 3A) and the communication device 1102 owned by the receiver (user B 302 in FIG. 3A). Note that, in this embodiment, description is made with regard to transmitting and receiving image data of photograph. The data to be transmitted and received, however, is not limited to this and other type of electronic data may be adapted.

Figure 11A:
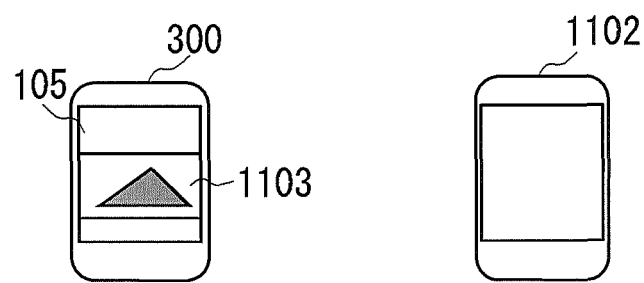
FIGS. 11A to 11F are explanatory diagrams explaining transmitting and receiving image data.
Figure 11B:
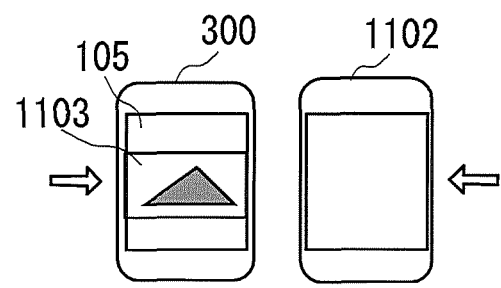

In FIG. 11A, a photograph 1103 is displayed on the transmitter's information processing device 300. The transmitter transmits the photograph 1103 to the communication device 1102. FIG. 11B shows a situation where the information processing device 300 and the communication device 1102 are brought close to each other to enable the transmission and reception of electronic data. To bring close to each other, the information processing device 300 and the communication device 1102 can transmit and receive electronic data through near field communication.

Figure 11C:
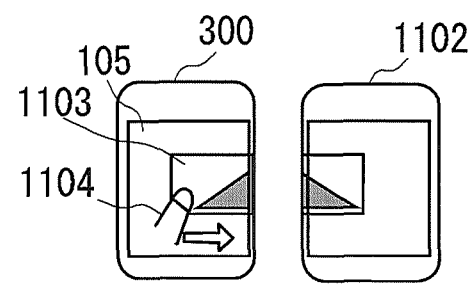

In FIG. 11C, the transmitter performs touch operation (drag) 1104 on the touch panel 105 of the information processing device 300. Through the touch operation, the transmitter drags the photograph 1103 in a direction at which the communication device 1102 exists. A part of the photograph 1103 is displayed on the communication device 1102. The ratio of the photograph displayed on the communication device 1102 is determined based on the operation amount (movement amount of finger) of the transmitter's touch operation on the touch panel 105.

Figure 11D:
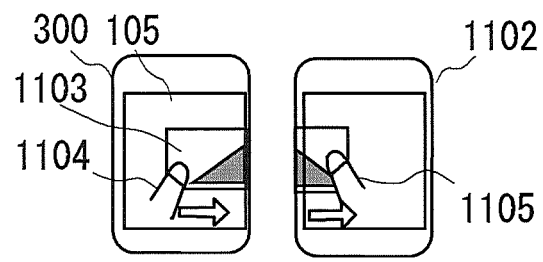
Figure 11E:
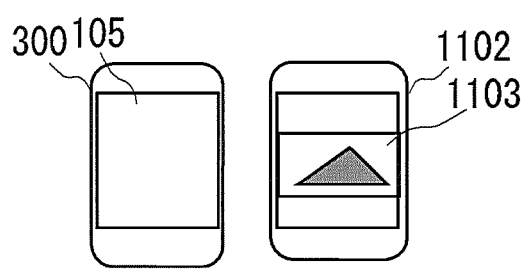

In FIG. 11D, the receiver, who is the owner of the communication device 1102, receives a part of the photograph 1103 displayed on the communication device 1102 through the touch operation (drag) 1105. The direction of the receiver's touch operation 1105 is identical to that of the transmitter's touch operation 1104 with the information processing device 300. It means that, viewing from the communication device 1102, the touch operation 1105 is performed in a direction opposite to where the information processing device 300 exists. FIG. 11E shows a state where the transmission of electronic data of the photograph 1103 to the communication device 1102 is completed. The state turns to the state as shown in FIG. 11E if the transmission of the electronic data is successfully completed.

Figure 11F:
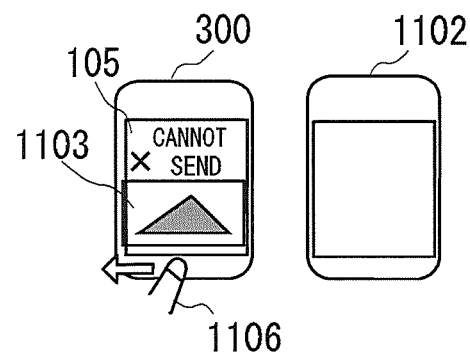

FIG. 11F shows a case where the transmitter performed a touch operation 1106 in a direction at which no communication device 1102 exists. In this case, no electronic data is transmitted. The UI screen representing that electronic data cannot be transmitted is displayed on the touch panel 105 of the information processing device 300.

Figure 12A:
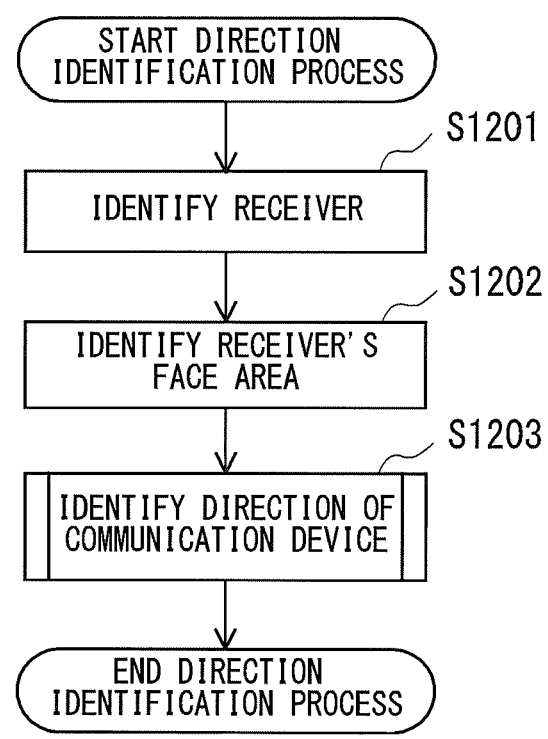
FIG. 12A is a flowchart illustrating process for identifying a direction of a communication counterpart.
Figure 12B:
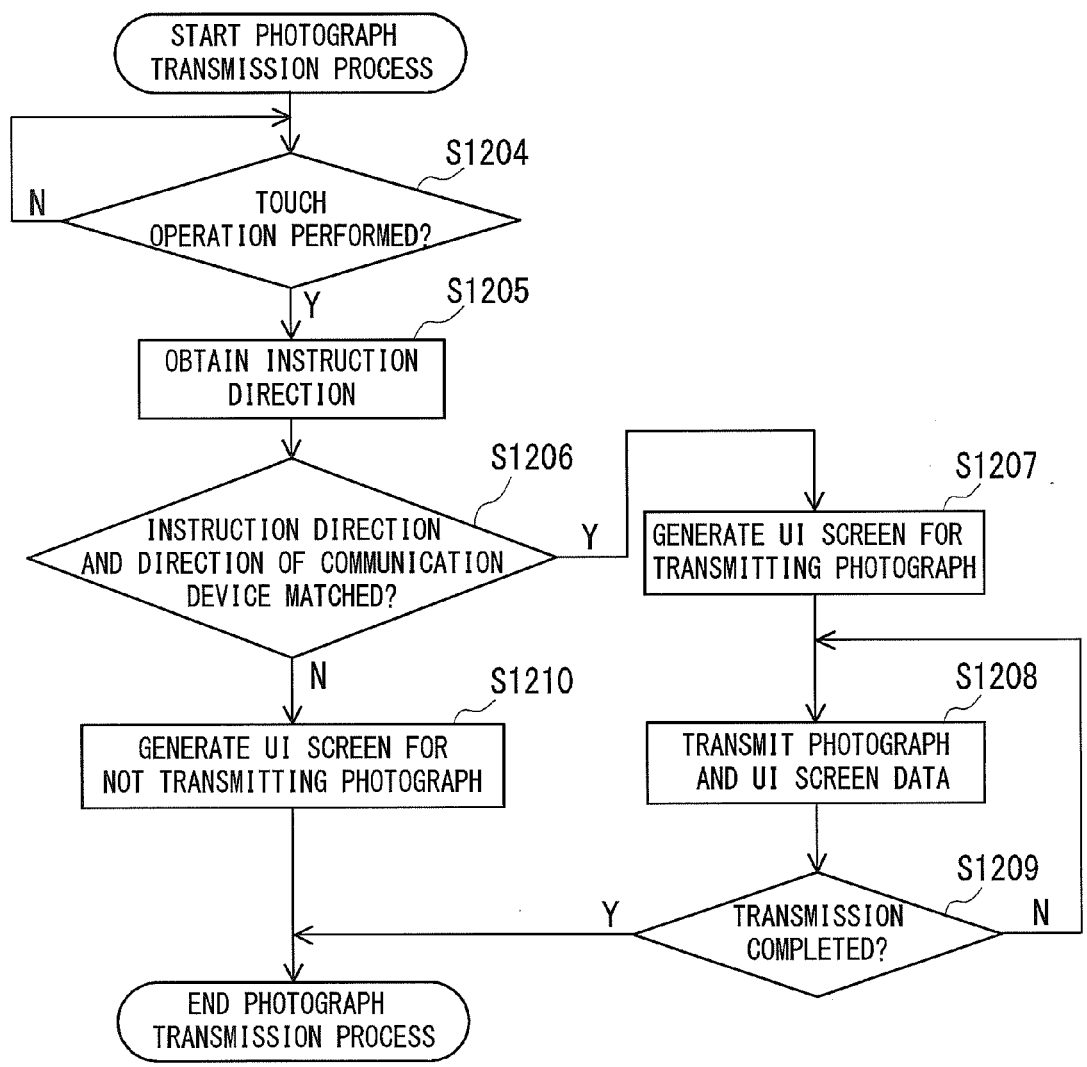
FIG. 12B is a flowchart illustrating transmission process.

FIGS. 12A and 12B are flowcharts illustrating the process of information processing device 300 for realizing the operations described in FIGS. 11A to 11F. The process is started with the start-up of any given application software, start-up of information processing device 300 or started by the owner's selection of the image to be transmitted. The process is repeatedly performed every time the image imaged by the camera 107 is updated.

FIG. 12A illustrates a flowchart illustrating process for identifying, by the information processing device 300, a direction at which the communication device 1102 owned by the receiver exists.

The imaging part 109 transmits the image data of the image imaged by the camera 107 to the face identification part 910. The face identification part 910 receives the image data transmitted from the imaging part 109 and detects all face images included in the image by the received image data to identify the receiver (S1201). The face identification part 910 identifies the receiver from the face image with reference to the registration table. The receiver can be identified through the processes of the first embodiment and the second embodiment. In a case where the detected face image is not registered in the registration table, the face identification part 910 ignores the face image. In this example, the face identification part 910 detects the face image 307 of the user A 301 and the face image 306 of the user B 302 from the image 308 of FIG. 3B. The face identification part 910 identifies the user A 301, who is the transmitter, from the detected face image 307 with reference to the registration table. Further, the face identification part 910 identifies the user B 302 from the detected face image 306 with reference to the registration table and set the user B 302 to the receiver. To set the receiver, the face identification part 910 turns the attribute data 313 of the registration data for the user B 302 to "receiver". This identifies the "device B" to be the communication device 1102 of the communication counterpart.

When the receiver is identified by the face identification part 910, the image processing part 911 identifies the face region in which the face image 306 of the receiver is displayed (S1202). After identifying the receiver's face region, the direction identification part 912 identifies the direction of the communication device 1102 (device B) with respect to the information processing device 300 in accordance with the position of the face area (S1203). The details of the process for identifying the direction at which the communication device 1102 exists will be described later. As above, the process for identifying the direction of the communication device 1102 owned by the receiver to the information processing device 300 is ended.

FIG. 12B illustrates a flowchart illustrating process for transmitting image data of a photograph (displayed image) to the communication device 1102. The process is executed in parallel with the process as shown in FIG. 12A.

The input part 918 determines whether or not the transmitter (user A 301) has performed the touch operation (drag) on the photograph being displayed (photograph 1103 in FIG. 11A) (S1204). The input part 918 waits until the touch operation is performed. When the touch operation is performed (S1204: Y), the direction acquisition part 917 acquires the direction to which the touch operation is performed (instruction direction through drag operation) (S1205). The direction acquisition part 917 receives the touch operation information representing the content of the touch operation from the input part 918. In accordance with the content of the touch operation information received, the direction acquisition part 917 acquires the instruction direction by the touch operation.

The direction determination part 916 determines whether or not the instruction direction acquired in the direction acquisition part 917 matches the direction of the communication device 1102 identified at step S1203 with respect to the information processing device 300 (S1206).

If it is determined that both match (S1206: Y, FIG. 11C), the UI screen generation part 914 generates the UI screen for transmitting the image data of the photograph (S1207). The UI screen generation part 914 receives the touch operation information from the input part 918 and generates the UI screen based on the received touch operation information. The transmission part 915 transmits the image data of the photograph and generated UI data representing the UI screen to the communication device 1102 (S1208). When the receiving part 919 receives the completion notice notifying that the reception of data from the communication device 1102 has completed, the process for transmitting the image data of the photograph is ended (S1209: Y).

Note that, if it is determined that both do not match at the step S1206 (S1206: N, FIG. 11F), the UI screen generation part 914 generates the UI screen for not transmitting the image data of the photograph and completes the process (S1210). The UI screen is displayed on the touch panel 105 of the information processing device 300. For example, in such a UI screen, message is displayed. Alternatively, such a UI is configured such that dragged photograph cannot go beyond the display screen of the touch panel 105 of the information processing device 300. In the latter case, the UI screen is configured such that the dragged photograph can be moved to the end of the display screen, however, once it reached to the end of the display screen, it won't move further even in an attempt to drag.

As above, through the identification of the direction (position) of the communication device 1102 with respect to the information processing device 300, depending on which direction the touch panel 105 is operated thereafter, it is determined whether or not transmission of the image data is performed. Therefore, it becomes possible for the transmitter to transmit the electronic data with simple and intuitive operation.

Note that, at step S1208, the communication device 1102 receives the image data of the photograph and the UI screen data. The UI screen data includes information about movement distance by the touch operation and the like. The communication device 1102 generates and displays the UI screen for the communication device 1102 using the UI screen data. The receiver performs the touch operation 1105 on the display screen of the communication device 1102. The content of the operation is transmitted from the communication device 1102 to the information processing device 300. When generating the UI screen at step S1207, the image generation part 914 of the information processing device 300 generates the UI screen, taking the content of the operation transmitted from the communication device 1102 into consideration. This enables to display as shown in FIG. 11D.

In this embodiment, description was made in a case where determination is made whether or not to transmit the image data in accordance with the direction of touch operation on the touch panel 105, however, other operation may be adapted for determining whether or not transmission of image data is possible. For example, movement (gesture) of transmitter's hand may be detected through video from the in-camera 304 or an infrared sensor. According to the movement direction, determination may be made whether or not transmission of image data is possible.

Further, for example, the processes in FIG. 12A may be followed after the completion of the process at step S1205 in FIG. 12B. In this case, after the completion of the processes in FIG. 12A, processes after step S1206 are performed.

Figure 14A:
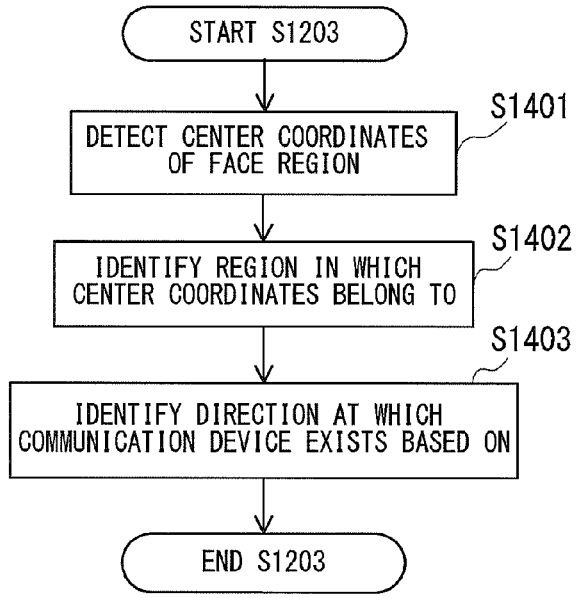
FIGS. 14A to 14C are flowcharts illustrating direction identification process.
Figure 14B:
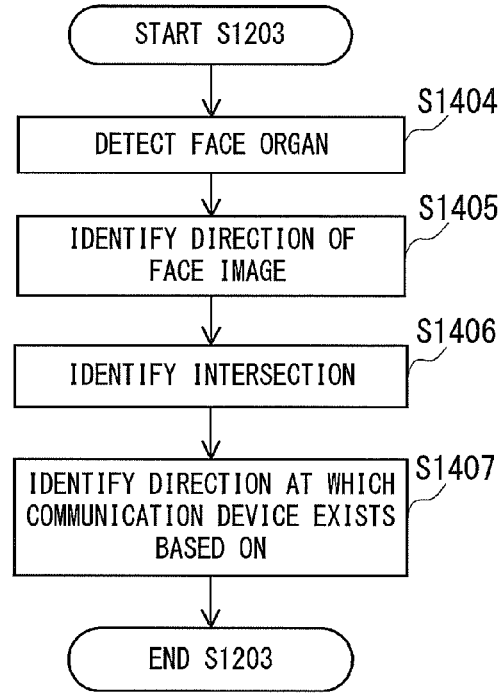
Figure 14C:
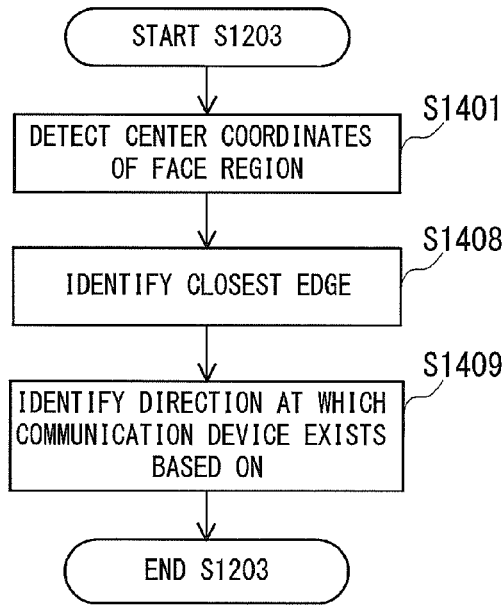

Description is made with regard to the process at step S1203, in which the direction at which the communication device 1102 exists is identified. FIGS. 13A to 13D are diagrams illustrating the image 308 which includes the face image 306 of the receiver imaged by the in-camera 304. The direction (position) of the communication device 1102 with respect to the information processing device 300 is identified in accordance with the position of the face image 306, direction of the face image 306, or position relation with the transmitter's face image 307 in the image 308. FIGS. 14A to 14C are flowcharts representing the processes of step S1203.

FIG. 13A illustrates a diagram illustrating a case where the direction at which the communication device 1102 exists is determined in accordance with the position of center coordinates 1303 of the receiver's face region in the image 308. The image 308 is divided into four regions, 1305 to 1308, by dotted lines 1304. FIG. 14A illustrates a flowchart representing the process of step S1203 using such image 308.

The image processing part 911 detects the center coordinates 1303 of the face region identified at step S1202 in FIG. 12A (S1401). The center coordinates 1303 of the face region represents center of gravity coordinates of the face region. Alternatively, it represents coordinates of middle point calculated from up-and-down and right-and-left coordinates of the face region.

The image processing part 911 identifies the region in the image 308 in which the detected center coordinates 1303 belong to (S1402). In the example of FIG. 13A, the central coordinates 1303 belong to the region 1305. The direction identification part 912 identifies the direction at which the communication device 1102 exists with respect to the information processing device 300 based on the region 1303 where the center coordinates belong to and then, ends the process (S1403).

In the example of FIG. 13A, in a case where the center coordinates 1303 belong to the region 1305, the direction identification part 912 identifies that the communication device 1102 exists in a left direction of the information processing device 300. In a case where the center coordinates 1303 belong to the region 1306, the direction identification part 912 identifies that the communication device 1102 exists in a front direction of the information processing device 300. In a case where the center coordinates 1303 belong to the region 1307, the direction identification part 912 identifies that the communication device 1102 exists in a right direction of the information processing device 300. In a case where the center coordinates 1303 belong to the region 1308, the direction identification part 912 identifies that the communication device 1102 exists in a back direction of the information processing device 300. Note that, in this example, the direction is identified based on the position of the center coordinates 1303, however, the direction may be identified based on other position (characteristic parts such as eyes) of the face image 306.

FIG. 13B illustrates a diagram illustrating a case where the direction at which the communication device 1102 exists is determined based on the direction of the receiver's face image 306 in the image 308. The information processing device 300 identifies the direction of the face image 306 based on the positions of the organs such as eyes, nose and the like in the face image 306. The information processing device 300 identifies the direction at which the communication device 1102 exists in accordance with a straight line 1309 passing through the right and left eyes of the face image 306, a straight line 1310 which is vertical to the straight line 1309 and which passes through the nose position, and an intersection 1311 of the straight line 1310 and the edge of the image 308. FIG. 14B illustrates a flowchart representing the process of step S1203 using such image 308.

The image processing part 911 detects the position of the face organ (eyes and nose) from the face image 306 (S1404). The image processing part 911 detects the positions of eyes and nose through any known image recognition technology. The image processing part 911 identifies the direction of the face image 306 based on the position of detected eyes and nose (S1405). Here, the direction of the face means the direction of the straight line 1310 which goes toward the nose from the eyes. The image processing part 911 identifies the intersection 311 of a line, which is obtained by extending the straight line 1310 from the eyes toward the nose direction, and the edge of the image 308 (S1406). The direction identification part 912 identifies the direction at which the communication device 1102 exists with respect to the information processing device 300 based on the intersection 1311 and then, completes the process (S1407).

In the example of FIG. 13, the intersection 1311 lies at the left edge of the image 308. Therefore, the direction identification part 912 identifies that the communication device 1102 exists in a left direction of the information processing device 300. Similarly, in a case where the intersection 1311 lies at the upper edge of the image 308, the direction identification part 912 identifies that the communication device 1102 exists in a front direction of the information processing device 300. In a case where the intersection 1311 lies at the right edge of the image 308, the direction identification part 912 identifies that the communication device 1102 exists in a right direction of the information processing device 300. In a case where the intersection 1311 lies at the lower edge of the image 308, the direction identification part 912 identifies that the communication device 1102 exists in a back direction of the information processing device 300.

FIG. 13C illustrates a diagram illustrating a case where the direction at which the communication device 1102 exists is determined based on the distance from the center coordinates 1303 of the receiver's face region to the respective edges 1312 to 1315 in the image 308. FIG. 14C illustrates a flowchart representing the process of step S1203 using such image 308.

The image processing part 911 detects the center coordinates 1303 of the face region in a manner similar to that at step S1401 in FIG. 14A (S1401). The image processing part 911 identifies the edge which locates closest to the center coordinates 1303 among the edges 1312 to 1315 in the image 308 (S1408). The image processing part 911 calculates the distance from the center coordinates 1303 to the respective edges 1312 to 1315 and identifies the edge having the shortest distance as the closest edge. In FIG. 13C, the edge 1312 is identified as the closest edge.

The direction identification part 912 identifies the direction at which the communication device 1102 exists with respect to the information processing device 300 based on the closest edge 1312 (S1309). In the example of FIG. 13C, the edge 1312, which lies at the left side of the image 308, is the closest edge. Therefore, the direction identification part 912 identifies that the communication device 1102 exists in a left direction of the information processing device 300. In a case where the edge 1313, which lies at the upper side of the image 308, is the closest edge, the direction identification part 912 identifies that the communication device 1102 exists in a front direction of the information processing device 300. In a case where the edge 1314, which lies at the right side of the image 308, is the closest edge, the direction identification part 912 identifies that the communication device 1102 exists in a right direction of the information processing device 300. In a case where the edge 1315, which lies at the lower side of the image 308, is the closest edge, the direction identification part 912 identifies that the communication device 1102 exists in a back direction of the information processing device 300.

Figure 15A:
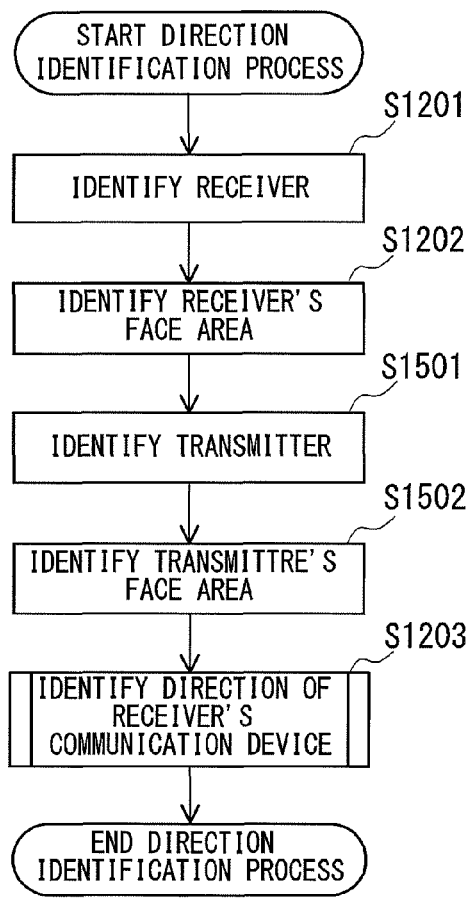
FIGS. 15A and 15B are flowcharts illustrating process for identifying the direction of the communication counterpart.
Figure 15B:
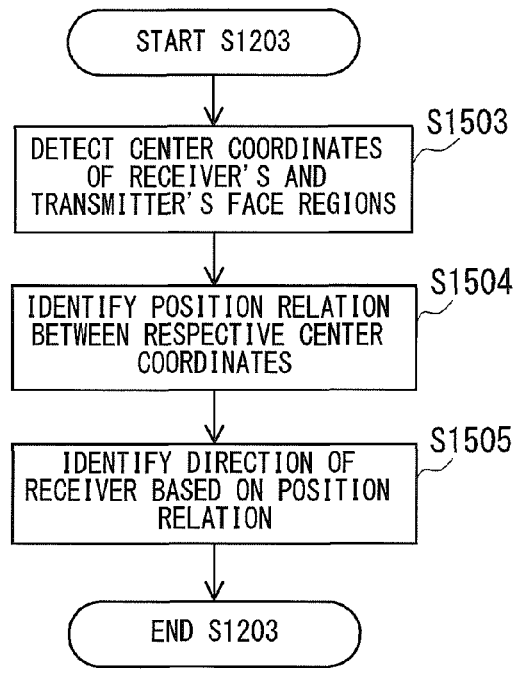

FIG. 13D illustrates a diagram illustrating a case where the direction at which the communication device 1102 exists is determined based on a straight line 1318 and an intersection 1319 of the edge of the image 308, the straight line 1318 passing through the center coordinates 1316 of the transmitter's face region and the center coordinates 1303 of the receiver's face region. FIGS. 15A and 15B illustrate flowcharts representing processes for identifying the direction at which the communication device 1102 exists from such image 308.

FIG. 15A illustrates a flowchart representing processes for identifying the direction at which the communication device 1102 exists with the information processing device 300. The same step numbers are assigned to the steps identical to those shown in the flowchart of FIG. 12A.

When the face identification part 910 identifies the face region of the receiver through the steps S1201 and S1202, the face identification part 910 identifies the transmitter's face region from the image 308 through the similar processes (S1501, S1502). The face identification part 910 detects the transmitter's face image 307 and identifies the transmitter based on the registration data of the user A in the registration table of FIG. 10. Further, the face identification part 910 identifies the transmitter's face region based on the detected face image 307. When the identification of the transmitter's face region is completed, the direction at which the communication device 1102 exists is identified (S1203).

FIG. 15B illustrates a flowchart representing the processes of step S1203.

The image processing part 911 detects the center coordinates 1303 of the receiver's face region and the center coordinates 1316 of the transmitter's face region (S1503). This process is similar to that of step S1401 in FIG. 14A. The image processing part 911 identifies the position relation between the detected center coordinates 1303 and 1316 (S1504). In FIG. 13D, the image processing part 911 identifies the intersection 1319 of the line which extended the straight line 1318 from the center coordinates 1316 toward the center coordinates 1303 and the edge of the image 308. The intersection 1319 represents the position relation between the center coordinates 1303 and 1316. The direction identification part 912 identifies the direction at which the communication device 1102 exists to the information processing device 300 based on the position relation between the center coordinates 1303 and 1316 and completes the process (S1505).

In the example of FIG. 13D, the intersection 1319 lies at the left edge of the image 308. Therefore, the direction identification part 912 identifies that the communication device 1102 exists in a left direction of the information processing device 300. In a case where the intersection 1319 lies at the upper edge of the image 308, the direction identification part 912 identifies that the communication device 1102 exists in a front direction of the information processing device 300. In a case where the intersection 1319 lies at the right edge of the image 308, the direction identification part 912 identifies that the communication device 1102 exists in a right direction of the information processing device 300. In a case where the intersection 1319 lies at the lower edge of the image 308, the direction identification part 912 identifies that the communication device 1102 exists in a back direction of the information processing device 300.

As above, through a simple operation, it is possible to identify the direction at which the communication device 1102 exists with respect to the information processing device 300. Note that addition of process or configuration such as sensor as described below enables to identify the direction at higher accuracy.

Fourth Embodiment

Figure 16A:
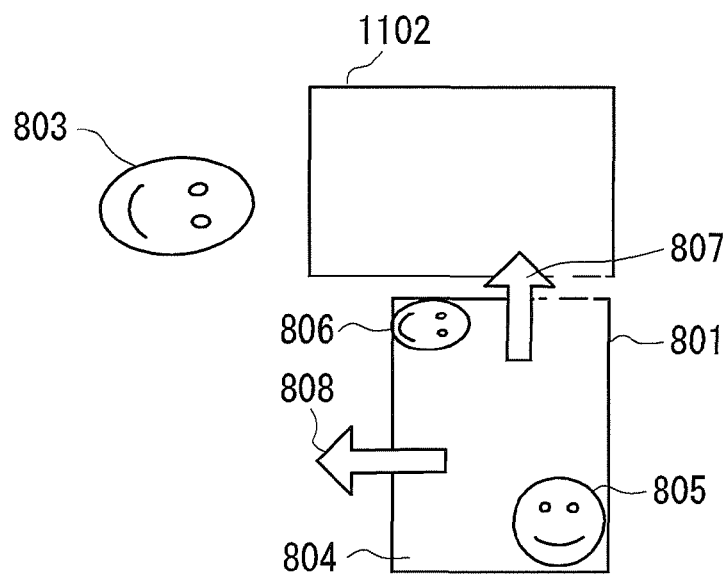
FIGS. 16A to 16C are diagrams illustrating cases where it is difficult to identify the direction of a communication device.
Figure 16B:
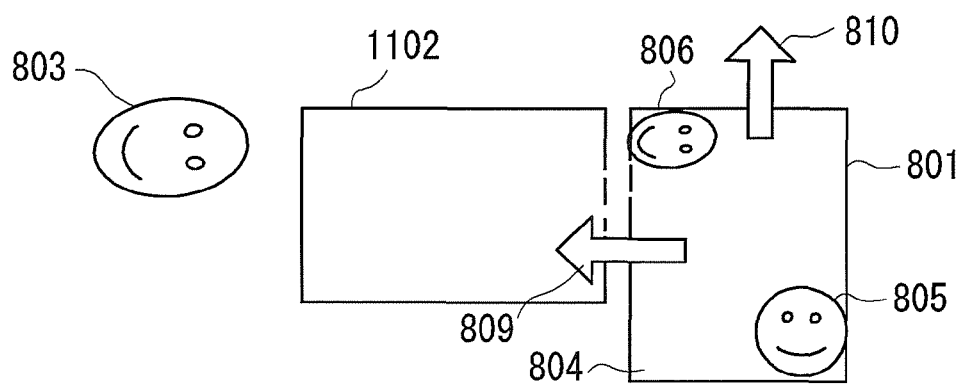
Figure 16C:
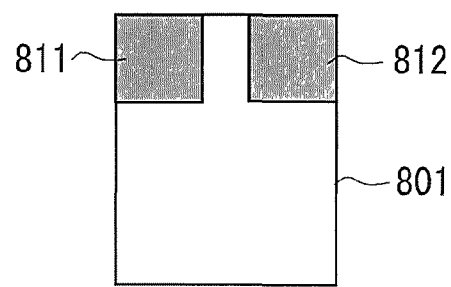

FIGS. 16A to 16C are diagrams illustrating cases where it is difficult to identify the direction at which communication device owned by the receiver exists based on the displayed position and direction of the face image.

FIG. 16A illustrates a diagram representing a state where the communication device 1102 owned by a receiver 803 is positioned in a front direction of an information processing device 801 owned by a transmitter. A face image 806 of the receiver 803 and a face image 805 of the transmitter are photographed in an image 804 imaged by a camera of the information processing device 801. Note that the image 804 is not displayed on the display of the information processing device 801.

In the information processing device 801 and the communication device 1102 having such position relation, the transmitter performs a touch operation (drag) on a touch panel of the information processing device 801 in a direction at which the communication device 1102 exists. Through this, the image data is transmitted from the information processing device 801 to the communication device 1102. If the transmitter performs the touch operation in other direction (for example, direction 808), the image data is not transmitted.

FIG. 16 B illustrates a diagram representing a state where the communication device 1102 is positioned in a left direction of the information processing device 801. In the information processing device 801 and the communication device 1102 having such position relation, the transmitter performs a touch operation (drag) on a touch panel of the information processing device 801 toward a direction 809 at which the communication device 1102 exists. Through this, the image data is transmitted from the information processing device 801 to the communication device 1102. If the transmitter performs the touch operation in the other direction (for example, direction 810), the image data is not transmitted.

In FIGS. 16A and 16B, the face image 805 of the transmitter and the face image 806 of the receiver 803 are respectively photographed in the image 804 at the same position and in a same direction, the image 804 imaged by the in-camera of the information processing device 801. Therefore, in such images 804 as shown in FIGS. 16A and 16B, it is difficult to identify the direction (position) at which the communication device 1102 exists with respect to the information processing device 801.

FIG. 16C illustrates a diagram representing a region where is difficult to identify the direction at which the communication device 1102 exists based on the position and the direction of the face image in the image 804. If the receiver's face image 806 is photographed in the specified regions 811 and 812, the direction at which the communication device 1102 exists cannot be identified. The specified regions 811 and 812 are previously stored in the information processing device 801.

Figure 17A:
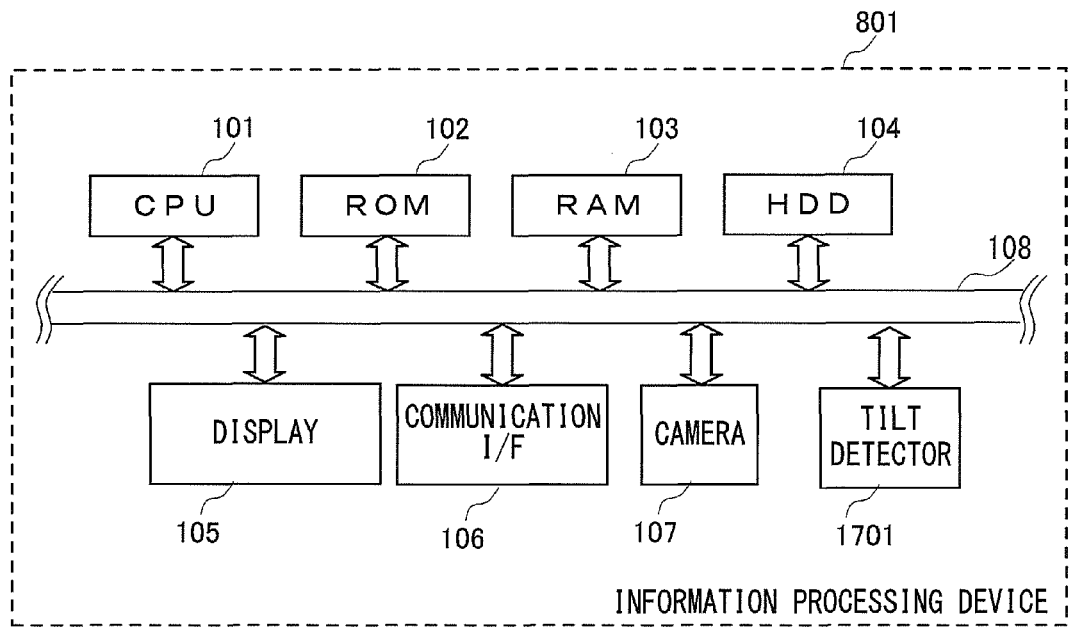
FIG. 17A is a hardware configuration diagram of the information processing device and FIG. 17B is a functional block diagram of the information processing device.
Figure 17B:
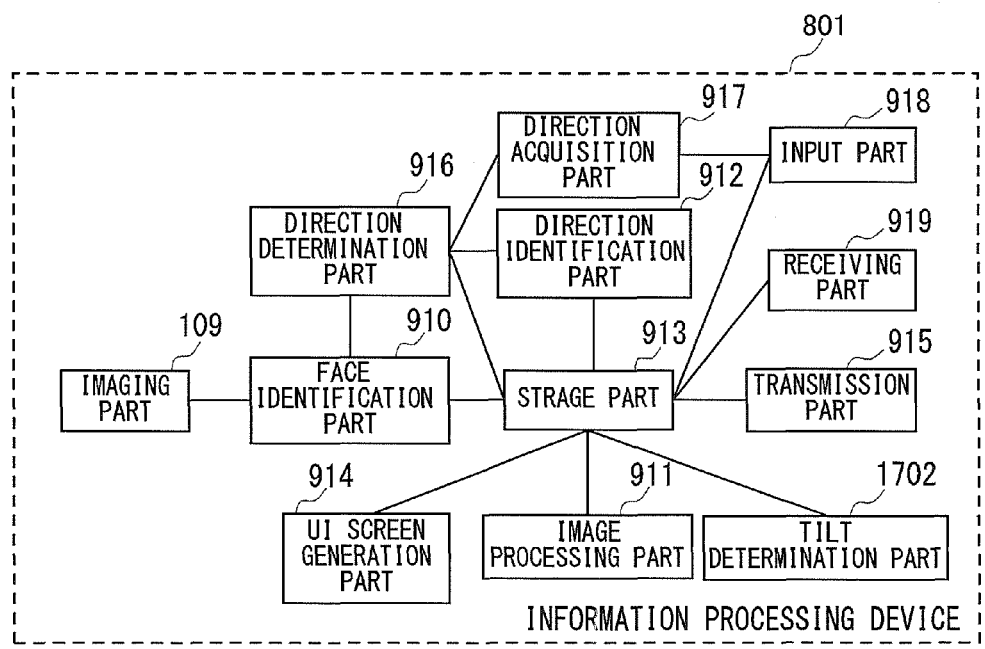

In the fourth embodiment, even it is difficult to identify the direction at which the communication device 1102 exists, the information processing device 801 capable of identifying the direction (position) at which the communication device 1102 exists with respect to the information processing device 801 is provided. FIGS. 17A and 17B are diagrams representing a configuration of the information processing device 801. FIG. 17A illustrates a hardware configuration diagram of the information processing device 801. The information processing device 801 is configured such that a tilt detector 1071 is added to the information processing device 100 of the first embodiment of FIG. 1. The same numbers are assigned to the configurations identical to those of the information processing device 100. The descriptions of the same configurations are omitted.

The tilt detector 1701 detects the tilt (posture) of the information processing device 801 body. As the tilt detector 1701, gyro sensor, acceleration sensor, and geomagnetic sensor may be used. The tilt detector 1701 detects tilts of three axes of pitch, roll, and yaw of the information processing device 801.

FIG. 17B illustrates a function block diagram of the information processing device 801. The information processing device 801 is configured in such a manner that a tilt determination part 1702 is added to the function formed in the information processing device 300 of the third embodiment (see FIG. 9). The same numbers are assigned to the configurations identical to those of the information processing device 300. The descriptions of the same configurations are omitted. The tilt determination part 1702 analyzes the detection result obtained from the tilt detector 1701 and determines the tilt (posture) of the information processing device 801.

Figure 18:
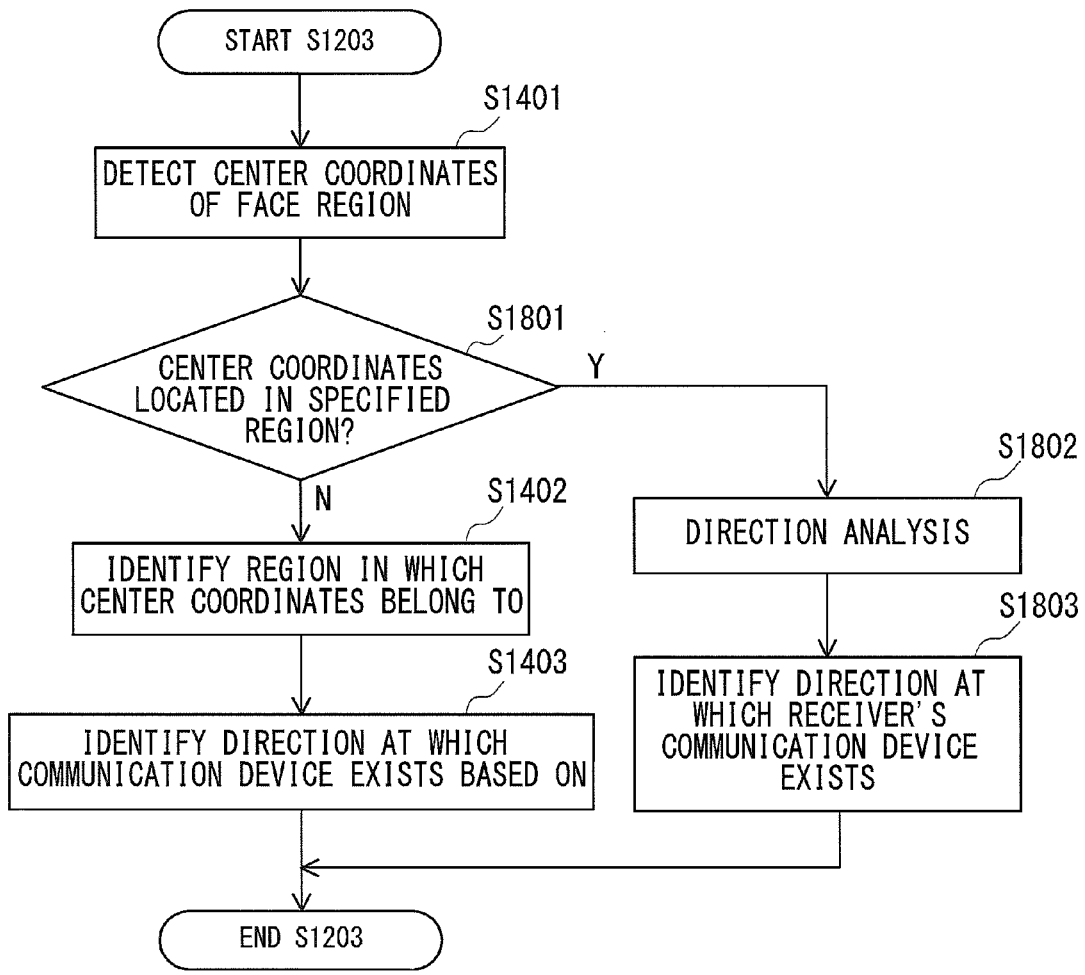
FIG. 18 is a flowchart illustrating process for identifying the direction of the communication counterpart.

FIG. 18 illustrates a flowchart representing the process of step S1203 in FIG. 12A through the information processing device 801. The same step numbers are assigned to the steps identical to those shown in the flowchart in FIG. 14A of the third embodiment.

The image processing part 911 detects the center coordinates of the receiver's face region 803 in a manner similar to that at step S1401 in FIG. 14A (S1401). The image processing part 911 determines whether or not the center coordinates of the detected face region are included in either the specified region 811 or the specified region 812 in FIG. 16C (S1801). If the center coordinates are included in either the specified region 811 or the specified region 812 (S1801: Y), the direction identification part 912 analyzes the direction at which the communication device 1102 exists with supplemental information (S1802). The supplemental information is the information which is capable of identifying the direction at which the communication device 1102 exists and which is information other than the face region of the receiver 803. Through the directional analysis with the supplemental information, the direction at which the communication device 1102 exists is calculated. The direction identification part 912 identifies the direction at which the communication device 1102 exists with respect to the information processing device 801 based on the result of the directional analysis and the center coordinates of the face region of the receiver 803 and then, completes the process (S1803).

If no center coordinates of the face region of the receiver 803 is included in either of the specified region 811 or the specified region 812 (S1801: N), processes after the step S1402 in the FIG. 14A are executed. The direction identification part 912 identifies the direction at which the communication device 1102 exists and then, completes the process (S1403).

Description is made in a case where, as to the process of step S1802, changes of the face region of the receiver 803 are used as the supplemental information.

Figure 19A:
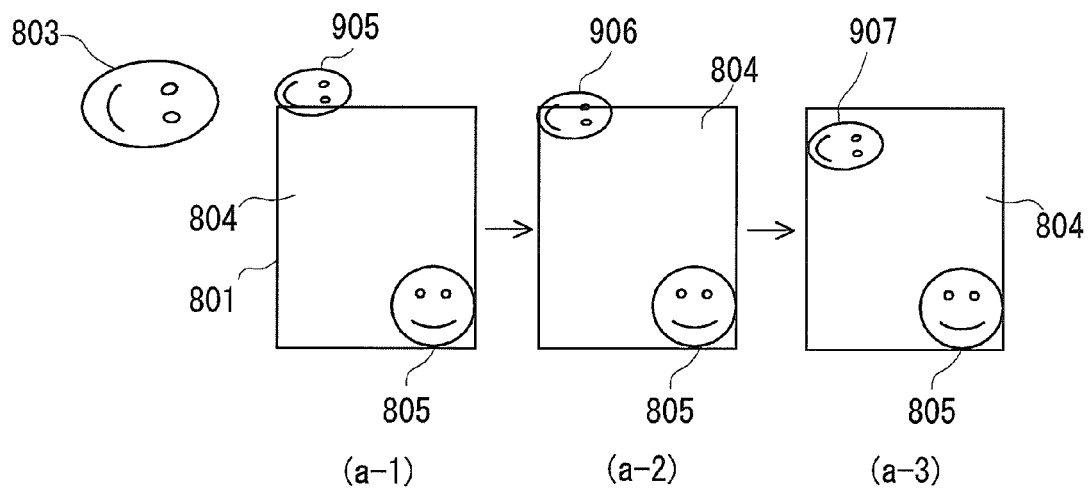
FIGS. 19A and 19B are diagrams illustrating situations where face image of the receiver is photographed.
Figure 19B:
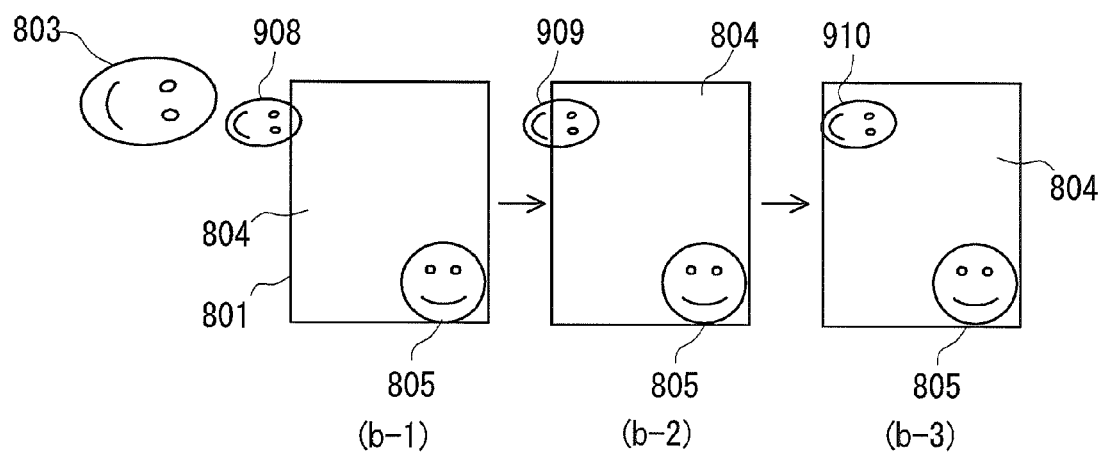

FIGS. 19A and 19B illustrate diagrams representing a state where the reviver's face image is photographed in the image consecutively imaged by the information processing device 801 owned by the transmitter. FIG. 19A illustrates a diagram representing a case where the communication device 1102 is positioned in a front direction of the information processing device 801 (state shown in FIG. 16A). FIG. 19B illustrates a diagram representing a case where the communication device 1102 is positioned in a left direction of the information processing device 801 (state shown in FIG. 16B).

In case of FIG. 19A, the face images 905, 906 and 907 of the receiver 803 are photographed in the image 804 imaged by the camera 107 of the information processing device 801 with the transmitter's face image 805. In the images 804 of (a-1) and (a-2), the respective face images 905 and 906 of the receiver 803 go beyond the image 804. The portions going beyond the image 804 are not imaged, however, in order to clarify how the face images are photographed, FIGS. 19A and 19B shows such portions.

The image 804 is generated in an order of (a-1), (a-2) and (a-3). In (a-1), a portion of the face image 905 of the receiver 803 is photographed. In (a-2), half of the face image 906 of the receiver 803 is photographed. In (a-3), entire face image 907 of the receiver 803 is photographed. FIG. 19A, the face images 905 to 907 of the receiver 803 are moved from top to bottom in the image 804. By identifying the movement of the face images 905 to 907, the direction of the communication device 1102 with respect to the information processing device 801 is identified. In a case where the face images 905 to 907 of the receiver 803 are moved from top to bottom in the image 804, the information processing device 801 identifies that the communication device 1102 is in a front direction.

In case of FIG. 19B, as shown in (b-1) to (b-3), the face images 908 to 910 of the receiver 803 are moved from left to right in the image 804. In this case, the information processing device 801 identifies that the communication device 1102 is in a left direction.

As above, the information processing device 801 identifies the direction at which the communication device 1102 exists through the use of the movement direction of the face images of the receiver 803 as the supplemental information. In order to obtain the supplemental information, the image data representing the image 804 imaged by the camera 107 is stored in the storage part 913 for a certain period of time (for example, two seconds). When processing the process of step S1802, the image processing part 911 reads the image data from the storage part 913 and analyzes the direction at which the position of the face region changes.

Description is made, as to the process of step S1802, in a case where the change of the tilt (posture) of the information processing device 801 body owned by the transmitter is used as the supplemental information.

Figure 20A:
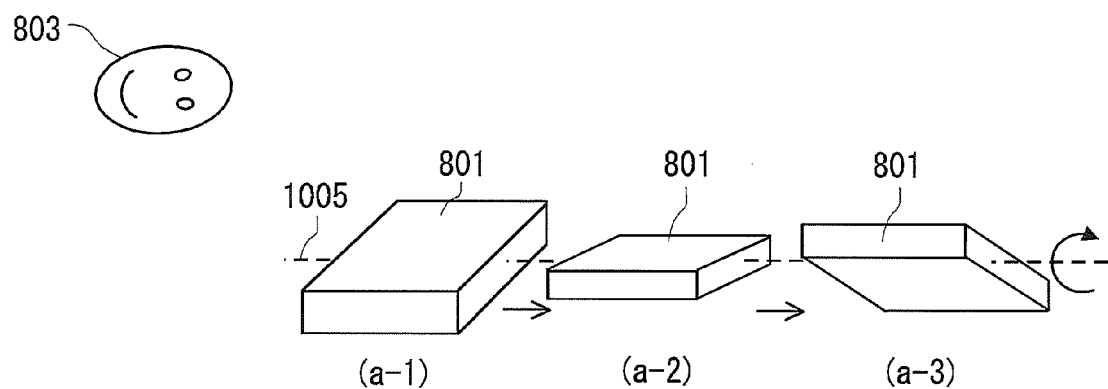
FIGS. 20A and 20B are diagrams illustrating how the tilt of the information processing device body is changed
Figure 20B:
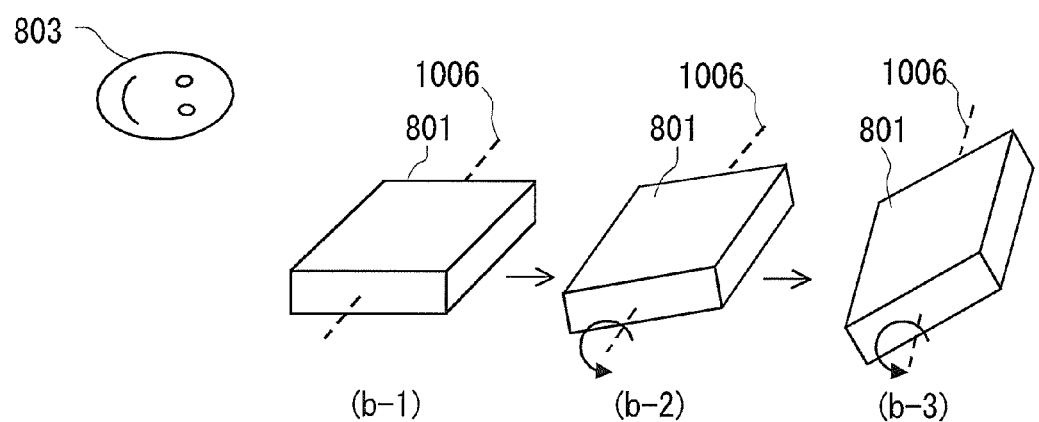

FIGS. 20A and 20B illustrate diagrams representing how the tilt of information processing device 801 body is changed.

FIG. 20A illustrates a diagram representing a change of the tilt of the information processing device 801 body in case where the communication device 1102 is positioned in a front direction of the information processing device 801 (case shown in FIG. 16A). FIG. 20B illustrates a diagram representing a case where the communication device 1102 is positioned in a left direction of the information processing device 801 (case shown in FIG. 16B).

In FIG. 20A, the information processing device 801 rotates with respect to the rotation axis 1005 (pitch). The information processing device 801 rotates in an order of (a-1) to (a-3). FIG. 20A shows a state of how the information processing device 801 is tilted in a front direction. The movement of the information processing device 801 is, for example, the movement for causing the receiver 803 to browse the photograph to be transmitted. Also, it is a preparation operation for transmitting the image data of the photograph to the communication device 1102 owned by the receiver 803.

In a case where the communication device 1102 is positioned in a front direction of the information processing device 801, the information processing device 801 is tilted in a front direction like this. The acquisition and determination of the change in the tilt (change in pitch) by the tilt determination part 1702 enable to identify the direction at which the communication device 1102 exists.

In FIG. 20B, the information processing device 801 rotates with respect to the rotation axis (roll). As shown in (b-1) to (b-3), the information processing device 801 body tilts in a left direction. The acquisition and determination of the change in the tilt (change in roll) by the tilt determination part 1702 enable to identify that the communication device 1102 is positioned in a left direction of the information processing device 801 (FIG. 16B).

The above is the description of the process in a case where the center coordinates of the face region of the receiver 803 exist in the specified region 811 in FIG. 16C. Also, in a case where the center coordinates of the face region of the receiver 803 exist in the specified region 812 of FIG. 16C, through the similar process, it is possible to identify the direction at which the communication device 1102 exists.

Description is made in a case where, as to the process of step S1802, the tilt of the information processing device 801 body owned by the transmitter is used as the supplemental information.

As above, the transmitter's behavior of tilting the information processing device 801 is the behavior for causing the receiver 803 to browse the photograph to be transmitted. It is also the preparation behavior for transmitting the image data of the photograph to the communication device 1102 owned by the receiver 803. Therefore, the transmitter tilts the information processing device 801 to the receiver side to some degree and stops tilting the information processing device 801. For example, the transmitter stops tilting the information processing device 801 in a state of (a-3) as shown in FIG. 20A or a state of (b-3) as shown in FIG. 20B. The tilt of the information processing device 801 is used as the supplemental information.

The tilt determination part 1702 determines the tilt of the information processing device 801 and identifies, through the determination result, the direction at which the communication device 1102 exists. In a case where the information processing device is tilted in a front direction, it is identified that the communication device 1102 is in a front direction. In a case where the information processing device is tilted in a left direction, it is identified that the communication device 1102 is in a left direction. In a case where the information processing device is tilted in a right direction, it is identified that the communication device 1102 is in a right direction. In a case where the information processing device is tilted in a back direction, it is identified that the communication device 1102 is in a back direction. It is not always the case that the information processing device 801 is tilted only in one direction. Therefore, the tilt determination part 1702 determines that, among the four directions of front, right, left, and back, the information processing device is tilted in a direction having maximum tilt.

The supplemental information as above may be combined and used. For example, the direction at which the communication device 1102 exists may be identified in accordance with the change of the face region of the receiver 803, change in tilt of the information processing device 801 body, and tilt of the information processing device 801. Then, the final direction may be determined based on majority decision. Further, each supplemental information may be prioritized and the direction may be identified by the supplemental information having high priority. In this case, in a case where the identified direction lacks accuracy, the direction is identified by the supplemental information having next priority.

As above, in the fourth embodiment, the direction of the communication device 1102 is determined using the supplemental information. Therefore, even in a case where the determination is difficult based on the position of the face region of the receiver 803, it becomes possible to accurately identify the direction at which the communication device 1102 exists.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of priority from Japanese Patent Application Nos. 2013-141729, filed Jul. 5, 2013, and 2013-141734, filed Jul. 5, 2013 which are hereby incorporated by reference herein in their entirety.

What is claimed is:

1. An information processing device comprising:
   an imaging unit;
   a storage unit configured to store a registered face image of an owner of the information processing device in association with the information processing device, and to store a face image of each of at least one person excluding the owner in association with the communication device owned by each of the at least one person;
   an identification unit configured to detect face images of a plurality of persons being included in an image imaged by the imaging unit and to identify, with reference to the registered face images stored in the storage unit, the person corresponding to the detected face image; and
   a decision unit configured to decide, among the identified persons identified by the identification unit, one person from the persons who are not the owner of the information processing device as a receiver who owns a communication device that is to be a communication counterpart of the information processing device, based on a difference between the owner of the information processing device and the other identified persons, the difference is defined based on a distance from the imaging unit to each of the identified persons, an area of the face image of each of the identified persons, illuminance of the face image of the identified persons, or a direction of the face image of the identified persons.

2. The information processing device according to claim 1, further comprising a distance data acquisition unit configured to acquire a distance from the imaging unit to the plurality of persons included in the image imaged by the imaging unit,
   wherein the decision unit is configured to decide a person with a first distance from the imaging unit as a receiver, and
   wherein a difference between the first distance and a distance from the imaging unit to the owner is within a predetermined value.

3. The information processing device according to claim 2, wherein the distance data acquisition unit is further configured to detect overlapping of the face images and body images of the plurality of persons and to correct the distance data in accordance with the overlapping.

4. The information processing device according to claim 1, further comprising an acquisition unit configured to acquire illuminance of the face image of the plurality of persons,
   wherein the decision unit is further configured to decide a person having a first illuminance of the face image as a receiver, and
   wherein a difference between the first illuminance of the face image and an illuminance of the face image of the owner is within a predetermined value.

5. The information processing device according to claim 1, wherein the decision unit is further configured to digitize a direction of the face image of each person to acquire digitized direction value of the direction of the face image and to decide a person having a first direction value of the face image as a receiver, and
   wherein a difference between the first direction value of the face image and a direction value of the face image of the owner is within a predetermined value.

6. An information processing device comprising:
   an imaging unit;
   a storage unit configured to store a registered face image of an owner of the information processing device in association with the information processing device, and to store a face image of each of at least one person excluding the owner in association with the communication device owned by each of the at least one person;
   an identification unit configured to detect face images of a plurality of persons being included in an image imaged by the imaging unit and to identify, with reference to the registered face images stored in the storage unit, the person corresponding to the detected face image; and a decision unit configured to decide, among the identified persons identified by the identification unit, one person from the persons who are not the owner of the information processing device as a receiver who owns a communication device that is to be a communication counterpart of the information processing device, wherein the decision unit is further configured to decide a person having a first area of the face image as the receiver, and wherein a difference between the first area of the face image and an area of the face image of the owner is within a predetermined value.

7. The information processing device according to claim 6, further comprising a direction identification unit configured to identify a direction in which the communication device exists in accordance with a region, wherein the communication device is owned by a person identified by the identification unit and the region displays the face image in the image imaged by the imaging unit.

8. The information processing device according to claim 7, further comprising a detection unit configured to detect center coordinates of a region in which the detected face image is displayed, wherein the identification unit is configured to detect the face image of the owner and the face image of the another person from the image imaged by the imaging unit and to identify, with reference to the registered face images stored in the storage unit, the owner and the another person corresponding to the detected face image, wherein the direction identification unit is configured to identify a direction at which the communication device that is owned by the identified other person exists in accordance with a center coordinates of a region in which the face image of the owner is displayed and center coordinates of a region in which the face image of the other person is displayed.

9. The information processing device according to claim 7, further comprising a detection unit configured to detect center coordinates of a region in which the detected face image is displayed, wherein the storage unit stores a specified region located in the image, the specified region being incapable of identifying a direction at which the communication device which is owned by the person identified by the identification unit exists even in a case where the face image is displayed;

wherein the direction identification unit is configured to perform a direction analysis, and to identify, in accordance with a result of the direction analysis and the position of the center coordinates, a direction at which the communication device which is owned by the person identified by the identification unit exists, the direction analysis is performed if the center coordinates are included in the specified area, and the direction analysis is performed through the use of supplemental information, which is capable of identifying the direction at which the communication device exists which is information other than the area in which the face image is displayed.

10. The information processing device according to claim 7, further comprising:

a detection unit configured to detect center coordinates of a region in which the detected face image is displayed; and a second storage unit configured to store a specified region located in the image, the specified region being incapable of identifying a direction at which the communication device exists even in a case where the face image is displayed, the communication device being owned by the person identified by the identification unit, wherein the direction identification unit is configured to identify a direction at which the communication device exists in accordance with the region in which the face image in the image imaged by the imaging unit is displayed if the center coordinates are included in the specified area, and wherein the direction identification unit is configured to perform, if the center coordinates are not included in the specified area, a direction analysis and identify, in accordance with the result of the direction analysis and the position of the center coordinates, a direction at which the communication device which is owned by the person identified by the identification unit exists, the direction analysis is capable of identifying the direction at which the communication device exists, and the direction analysis is performed through the use of supplemental information which is the information other than the region in which the face image is displayed.

11. The information processing device according to claim 10, further comprising a tilt detection unit configured to detect a tilt of the information processing device, wherein the direction identification unit is configured to analyze a direction at which the communication device which is owned by the person identified by the identification unit exists by using the tilt as the supplemental information.

12. The information processing device according to claim 10, wherein the direction identification unit is configured to analyze a direction at which the communication device which is owned by the person identified by the identification unit exists using a change in region as the supplemental information, the region displaying the face image in the image consecutively imaged by the imaging unit.

13. An information processing device comprising:

an imaging unit;

a storage unit configured to store a registered face image of an owner of the information processing device in association with the information processing device, and to store a face image of each of at least one person excluding the owner in association with the communication device owned by each of the at least one person;

an identification unit configured to detect face images of a plurality of persons being included in an image imaged by the imaging unit and to identify, with reference to the registered face images stored in the storage unit, the person corresponding to the detected face image; and a decision unit configured to decide, among the identified persons identified by the identification unit, one person from the persons who are not the owner of the information processing device as a receiver who owns a communication device that is to be a communication counterpart of the information processing device, wherein the imaging unit is an camera, positioned in a location and direction enabling photographing a face of a person facing a display screen of the information processing device, and wherein the image imaged by the imaging unit to be used by the decision unit is not displayed on the display screen of the information processing device during the processing of the decision unit.

14. The information processing device according to claim 13, wherein, in a case where a portion of the face image of the owner is photographed in a latest image currently being processed, the identification unit is further configured to track and detect the face image of the owner using the image having photographed therein is the face image of the owner from the face images previously obtained.

15. The information processing device according to claim 14, further comprising a composition unit configured to generate a composite image, in a case where the owner is not included among those identified by the identification unit using the latest image currently being processed, through composition of an image having previously been acquired and including the owner therein with the latest image,
wherein the decision unit is configured to decide the receiver based on the composite image.

16. An information processing device comprising:
an imaging unit;
a storage unit configured to store a registered face image of an owner of the information processing device in association with the information processing device, and to store a face image of each of at least one person excluding the owner in association with the communication device owned by each of the at least one person;
an identification unit configured to detect face images of a plurality of persons being included in an image imaged by the imaging unit and to identify, with reference to the registered face images stored in the storage unit, the person corresponding to the detected face image; and
a decision unit configured to decide, among the identified persons identified by the identification unit, one person from the persons who are not the owner of the information processing device as a receiver who owns a communication device that is to be a communication counterpart of the information processing device;
a direction identification unit configured to identify a direction in which the communication device exists in accordance with a region, wherein the communication device is owned by a person identified by the identification unit and the region displays the face image in the image imaged by the imaging unit;
an organ detection unit configured to detect a position of at least one of parts of a face from the detected face image,
wherein the direction identification unit is further configured to identify a direction at which the communication device exists in accordance with a direction of the face image, and
wherein the communication device is owned by a person identified by the identification unit and the direction is identified in accordance with a position of the detected part of a face, wherein the parts of a face includes eyes or nose.

17. An information processing device comprising:
an imaging unit;
a storage unit configured to store a registered face image of an owner of the information processing device in association with the information processing device, and to store a face image of each of at least one person excluding the owner in association with the communication device owned by each of the at least one person;
an identification unit configured to detect face images of a plurality of persons being included in an image imaged by the imaging unit and to identify, with reference to the registered face images stored in the storage unit, the person corresponding to the detected face image; and
a decision unit configured to decide, among the identified persons identified by the identification unit, one person from the persons who are not the owner of the information processing device as a receiver who owns a communication device that is to be a communication counterpart of the information processing device;
a direction identification unit configured to identify a direction in which the communication device exists in accordance with a region, wherein the communication device is owned by a person identified by the identification unit and the region displays the face image in the image imaged by the imaging unit; and
a detection unit configured to detect center coordinates of a region in which the detected face image is displayed,
wherein the direction identification unit is configured to identify a direction at which the communication device exists in accordance with an edge of the image closest to the center coordinates, the communication device being owned by the person identified by the identification unit.

18. An information processing device comprising:
an imaging unit;
a storage unit configured to store a registered face image of an owner of the information processing device in association with the information processing device, and to store a face image of each of at least one person excluding the owner in association with the communication device owned by each of the at least one person;
an identification unit configured to detect face images of a plurality of persons being included in an image imaged by the imaging unit and to identify, with reference to the registered face images stored in the storage unit, the person corresponding to the detected face image;
a decision unit configured to decide, among the identified persons identified by the identification unit, one person from the persons who are not the owner of the information processing device as a receiver who owns a communication device that is to be a communication counterpart of the information processing device;
a direction identification unit configured to identify a direction in which the communication device exist in accordance with a region, wherein he communication device is owned by a person identified by the identification unit and the region displays the face image in the image imaged by the imaging unit;
an input unit configured to detect direction of a touch operation on a touch panel;
a determination unit configured to determine whether the direction of the touch operation matches the direction identified by the direction identification unit; and
a transmission unit configured to transmit electronic data to the communication device owned by the person identified by the identification unit in a case where both directions match as a result of the determination by the identification unit.

19. A method executed by an information processing device including an imaging unit, comprising:
storing a registered face image of an owner of the information processing device in association with the information processing device, and to store a face image of each of at least one person excluding the owner in association with the communication device owned by each of the at least one person;
detecting face images of a plurality of persons among the face images imaged by the imaging unit;
identifying with reference to the registered face images stored in the storage unit, the person associated with the detected face image;
deciding, among the identified persons, one person from the persons who are not the owner of the information processing device as a receiver who owns a communication device that is to be a communication counterpart of the information processing device; and deciding a person having a first area of the face image as the receiver, wherein a difference between the first area of the face image and an area of the face image of the owner is within a predetermined value.

20. A non-transitory computer readable storage medium storing computer executable instructions for causing a computer to execute a method, the method comprising:

stroring a registered face image of an owner of the computer in association with the information processing device, and to store a face image of each of at least one person excluding the owner in association with the communication device owned by each of the at least one person;

detecting face images of a plurality of persons among the face images imaged by the imaging unit;

identifying with reference to the registered face images stored in the storage unit, the person associated with the detected face image;

deciding, among the identified persons, one person from the persons who are not the owner of the information processing device as a receiver who owns a communication device that is to be a communication counterpart of the information processing device; and deciding a person having a first area of the face image as the receiver, wherein a difference between the first area of the face image and an area of the face image of the owner is within a predetermined value.

* * * * *